(12) United States Patent
Hwang et al.

(10) Patent No.: US 12,422,642 B2
(45) Date of Patent: Sep. 23, 2025

(54) CAMERA MODULE

(71) Applicant: SAMSUNG ELECTRO-MECHANICS CO., LTD., Suwon-si (KR)

(72) Inventors: Se Yeon Hwang, Suwon-si (KR); Kyung Ho Lee, Suwon-si (KR); Seok Hwan Kim, Suwon-si (KR); Seung Jae Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 579 days.

(21) Appl. No.: 17/861,749

(22) Filed: Jul. 11, 2022

(65) Prior Publication Data
US 2023/0176314 A1    Jun. 8, 2023

(30) Foreign Application Priority Data
Dec. 8, 2021    (KR) ........................ 10-2021-0175103

(51) Int. Cl.
*G02B 7/02*    (2021.01)
*G03B 5/00*    (2021.01)
*G03B 13/36*    (2021.01)

(52) U.S. Cl.
CPC ................ *G02B 7/021* (2013.01); *G03B 5/00* (2013.01); *G03B 13/36* (2013.01); *G03B 2205/0007* (2013.01); *G03B 2205/0046* (2013.01)

(58) Field of Classification Search
CPC ........ G02B 7/021; G02B 13/009; G02B 7/08; G03B 5/00; G03B 13/36;
(Continued)

(56) References Cited

U.S. PATENT DOCUMENTS 9,020,334 B1    4/2015    Suzuka
11,102,387 B2    8/2021    Lee et al.
(Continued)

FOREIGN PATENT DOCUMENTS

CN    103217853 A    7/2013
CN    107277307 A    10/2017
(Continued)

OTHER PUBLICATIONS

Korean Office Action issued on Sep. 11, 2023, in counterpart Korean Patent Application No. 10-2021-0175103 (6 pages in English, 5 pages in Korean).
(Continued)

*Primary Examiner* — Charles S Chang
(74) *Attorney, Agent, or Firm* — NSIP Law

(57) ABSTRACT

A camera module includes: a housing defining an internal space; a first lens module disposed in the internal space to move along an optical axis direction, the first lens module including at least one first bearing member; a second lens module disposed in the internal space to move along the optical axis direction, the second lens module including at least one second bearing member; a shaft disposed in the housing and supporting a first side of the first lens module and contacting the at least one first bearing member and supporting a first side of the second lens module and contacting the at least one second bearing member; at least one first ball member supporting a second side of the first lens module; and at least one second ball member supporting a second side of the second lens module.

16 Claims, 30 Drawing Sheets

(58) Field of Classification Search
CPC .... G03B 2205/0007; G03B 2205/0046; G03B 3/10; G03B 30/00; G03B 5/04; G03B 17/12; H04N 23/55; H04N 23/57

See application file for complete search history.

(56) References Cited

U.S. PATENT DOCUMENTS

| | | | |
|---|---|---|---|
| 11,575,821 | B2 | 2/2023 | Kim et al. |
| 11,624,891 | B2 | 4/2023 | Kawanabe |
| 2013/0188066 | A1 | 7/2013 | Suzuka |
| 2013/0258506 | A1 | 10/2013 | Lee |
| 2017/0139225 | A1 | 5/2017 | Lim |
| 2017/0160509 | A1 | 6/2017 | Wang et al. |
| 2018/0096204 | A1 | 4/2018 | Hyun et al. |
| 2018/0367714 | A1 | 12/2018 | Im et al. |
| 2019/0271825 | A1 | 9/2019 | Kawanabe |
| 2019/0346653 | A1 | 11/2019 | Kang et al. |
| 2020/0137274 | A1 | 4/2020 | Lee et al. |
| 2020/0348479 | A1 | 11/2020 | Kwon et al. |
| 2020/0351421 | A1 | 11/2020 | Park et al. |
| 2021/0018719 | A1 | 1/2021 | Park |
| 2021/0072495 | A1 | 3/2021 | Shin et al. |
| 2021/0096321 | A1 | 4/2021 | Choi |
| 2021/0302687 | A1 | 9/2021 | Jang |
| 2021/0352215 | A1 | 11/2021 | Kim et al. |
| 2021/0377450 | A1 | 12/2021 | Shabtay et al. |
| 2022/0026692 | A1 | 1/2022 | Machida et al. |
| 2022/0121001 | A1 | 4/2022 | Xu |
| 2022/0210300 | A1* | 6/2022 | Seo ................... H04N 23/51 |
| 2022/0256058 | A1 | 8/2022 | Kim et al. |
| 2022/0291475 | A1* | 9/2022 | Kim ..................... G02B 7/09 |
| 2022/0382013 | A1 | 12/2022 | Oh et al. |
| 2023/0161227 | A1 | 5/2023 | Kim et al. |
| 2023/0367181 | A1* | 11/2023 | Shin ................... H04N 23/54 |

FOREIGN PATENT DOCUMENTS

| | | |
|---|---|---|
| CN | 110036326 A | 7/2019 |
| CN | 111103742 A | 5/2020 |
| CN | 111856839 A | 10/2020 |
| CN | 211959318 U | 11/2020 |
| EP | 2 653 901 A1 | 10/2013 |
| JP | 3800612 B2 | 7/2006 |
| JP | 2011-85754 A | 4/2011 |
| JP | WO2018/105267 A1 | 6/2018 |
| KR | 20-0401042 Y1 | 11/2005 |
| KR | 10-2017-0056387 A | 5/2017 |
| KR | 10-2018-0098463 A | 9/2018 |
| KR | 10-2018-0135392 A | 12/2018 |
| KR | 10-2018-0137277 A | 12/2018 |
| KR | 10-2019-0036372 A | 4/2019 |
| KR | 10-2019-0119390 A | 10/2019 |
| KR | 10-2019-0129696 A | 11/2019 |
| KR | 10-2020-0047275 A | 5/2020 |
| KR | 10-2020-0126873 A | 11/2020 |
| KR | 10-2173328 B1 | 11/2020 |
| KR | 10-2021-0002820 A | 1/2021 |
| TW | 201341934 A | 10/2013 |
| TW | 201841017 A | 11/2018 |
| WO | WO 2020/060235 A1 | 3/2020 |

OTHER PUBLICATIONS

Indian Office Action issued on Jul. 27, 2022, in Indian Patent Application No. 202114059708 (counterpart of U.S. Appl. No. 17/554,618) (5 pages in English).

Korean Office Action issued on Jun. 1, 2023, in Korean Patent Application No. 10-2020-0185696 (counterpart of U.S. Appl. No. 17/554,618) (6 pages in English, 6 pages in Korean).

Non-Final Office Action issued on Jun. 20, 2023, in U.S. Appl. No. 17/554,618 (14 pages in English).

Final Office Action issued on Dec. 5, 2023, in U.S. Appl. No. 17/554,618 (11 pages in English).

Korean Office Action issued on Dec. 7, 2023, in Korean Patent Application No. 10-2020-0185696 (counterpart of U.S. Appl. No. 17/554,618) (5 pages in English, 5 pages in Korean).

Advisory Action issued on Mar. 29, 2024, in U.S. Appl. No. 17/554,618 (3 pages in English).

Chinese Office Action issued on Apr. 1, 2024, in Chinese Patent Application No. 202111622076.4 (counterpart of U.S. Appl. No. 17/554,618) (5 pages in English, 10 pages in Chinese).

Non-Final Office Action issued on Jun. 3, 2024, in U.S. Appl. No. 17/554,618 (12 pages in English).

Final Office Action issued on Nov. 20, 2024, in U.S. Appl. No. 17/554,618 (13 pages in English).

Notice of Allowance issued on Apr. 2, 2025, in U.S. Appl. No. 17/554,618 (8 pages in English).

U.S. Appl. No. 17/554,618, filed Dec. 17, 2021, Bo Sung Seo et al., Samsung Electro-Mechanics Co., Ltd.

Non-Final Office Action issued on Sep. 29, 2024, in U.S. Appl. No. 17/588,621 (14 pages in English).

Notice of Allowance issued on Apr. 4, 2025, in U.S. Appl. No. 17/588,621 (13 pages in English).

U.S. Appl. No. 17/588,621, filed Jan. 31, 2022, Jae Kyung Kim et al.

Chinese Office Action issued on Jul. 18, 2025, in counterpart Chinese Patent Application No. 202211228325.6 (3 pages in English, 6 pages in Chinese).

* cited by examiner

CAMERA MODULE

CROSS-REFERENCE TO RELATED APPLICATIONS APPLICATION(S)

This application claims the benefit under 35 USC 119 (a) of Korean Patent Application No. 10-2021-0175103 filed on Dec. 8, 2021, in the Korean Intellectual Property Office, the entire disclosure of which is incorporated herein by reference for all purposes.

BACKGROUND

1. Field

The following description relates to a camera module.

2. Description of Background

Cameras have been basically adopted in portable electronic devices such as smartphones, tablet PCs, and laptop PCs, and an autofocusing (AF) function, an optical image stabilization (OIS) function, a zoom function, and the like have been added to the cameras provided in the mobile terminals.

However, in order to implement various functions, a structure of a camera module has become complicated and a size of the camera module has increased, resulting in an increase in size of a portable electronic device in which the camera module is mounted.

In addition, when a lens or an image sensor is directly moved for optical image stabilization, it is required to consider not only a weight of the lens or the image sensor itself but also weights of other members to which the lens or the image sensor is attached, and thus, a predetermined level or more of driving force is required, resulting in an increase in power consumption.

Furthermore, in order to implement the AF function and the zoom function, it is required to secure a predetermined length or more so that a plurality of lens barrels may move a long stroke in an optical axis direction, and it is also required to prevent misalignment of optical axes between the plurality of lens barrels. However, it is difficult to implement such a structure in a very small and compact camera structure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing defining an internal space; a first lens module disposed in the internal space and configured to move along an optical axis direction, the first lens module including at least one first bearing member; a second lens module disposed in the internal space and configured to move along the optical axis direction, the second lens module including at least one second bearing member; a shaft disposed in the housing and supporting a first side of the first lens module and contacting the at least one first bearing member and supporting a first side of the second lens module and contacting the at least one second bearing member; at least one first ball member supporting a second side of the first lens module; and at least one second ball member supporting a second side of the second lens module.

The at least one first bearing member may be disposed on the first side of the first lens module, the at least one second bearing member may be disposed on the first side of the second lens module, and a quantity of the first bearing members may be different than a quantity of the second bearing members.

The at least one first bearing member may include a first bearing member disposed on the first side of the first lens module, the at least one second bearing member may include two second bearing members disposed on the first side of the second lens module and spaced apart from each other along the optical axis direction, the second side of the first lens module may be supported by two first ball members spaced apart from each other along the optical axis direction, and the second side of the second lens module may be supported by a single second ball member.

The second side of the first lens module may be longer in the optical axis direction than the first side of the first lens module in the optical axis direction, and the first side of the second lens module may be longer in the optical axis direction than the second side of the second lens module in the optical axis direction.

The camera module may include: first magnetic materials configured to generate a first magnetic force in a direction perpendicular to the optical axis direction disposed on surfaces of the first lens module and the housing facing each other, respectively; and second magnetic materials configured to generate a second magnetic force in a direction perpendicular to the optical axis direction disposed on surfaces of the second lens module and the housing facing each other, respectively.

A center of action of the first magnetic force may be located closer to the first ball members than the shaft, and a center of action of the second magnetic force may be located closer to the shaft than the second ball member.

The camera module may include: first magnets disposed on a side surface of the first lens module, and a first coil unit including a plurality of coils disposed to face the first magnets in a direction perpendicular to the optical axis direction; and second magnets disposed on a side surface of the second lens module, and a second coil unit including a plurality of coils disposed to face the second magnets in a direction perpendicular to the optical axis direction. The side surface of the first lens module and the side surface of the second lens module may be disposed opposite to each other with respect to an optical axis.

The first lens module may include a first guide hole penetrating through the first lens module in the optical axis direction and the second lens module may include a second guide hole penetrating through the second lens module in the optical axis direction, and the at least one first bearing member may be disposed in the first guide hole and the at least one second bearing member may be disposed in the second guide hole.

Each of the first and second bearing members may be an oilless bearing or a linear bearing having a cylindrical sleeve shape.

Guide grooves configured to accommodate the shaft may be disposed in a lower surface of the first lens module on the first side of the first lens module and in a lower surface of the second lens module on the first side of the second lens module, respectively, each of the bearing members may be disposed in a respective guide groove, and each of the bearing members may be a linear bearing having a hemispherical sleeve shape.

When the first lens module and the second lens module move along the optical axis direction, sliding friction may occur on the first side of the first lens module and on the first side of the second lens module, and rolling friction may occur on the second side of the first lens module and on the second side of the second lens module.

The camera module may include: a reflection module disposed on an object side of the first lens module and the second lens module and configured to change a path of incident light; and an image sensor module comprising an image sensor configured to receive light that has passed through the first lens module and the second lens module.

In another general aspect, a camera module includes: a housing defining an internal space; a first lens module disposed in the internal space and configured to move along an optical axis direction, the first lens module including at least one first bearing member; and a second lens module disposed in the internal space and configured to move along the optical axis direction, the second lens module including at least one second bearing member. The first lens module is movably supported by a first shaft, which is configured to interact with the first bearing member, and a first ball member, the second lens module is movably supported by a second shaft, which is configured to interact with the second bearing member and a second ball member, and the first shaft and the second shaft are disposed opposite to each other with respect to an optical axis.

When the first lens module moves, sliding friction may occur on the first shaft, and rolling friction may occurs on the first ball member, and when the second lens module moves, sliding friction may occur on the second shaft, and rolling friction may occur on the second ball member.

Each of the first bearing member and the second bearing member may be an oilless bearing or a linear bearing.

The first bearing member and the second bearing member may be integrally coupled to the first lens module and the second lens module, respectively, by insert injection.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
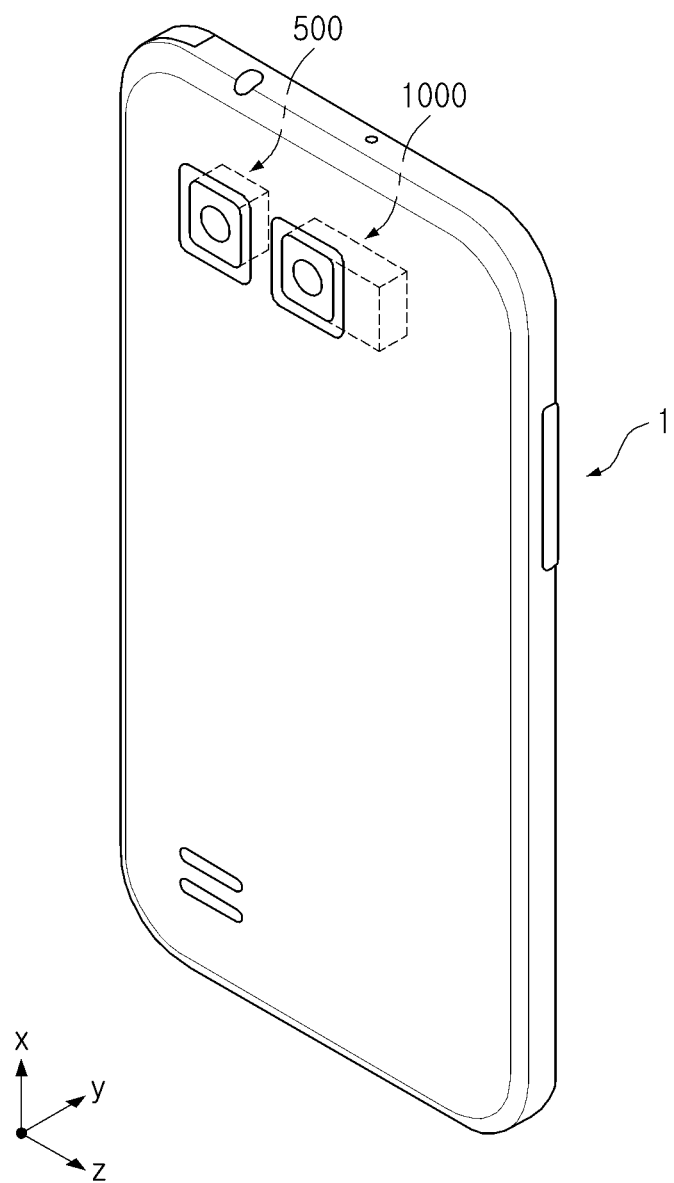
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Hereinafter, examples will be described in detail with reference to the accompanying drawings.

FIG. 1 is a perspective view of a portable electronic device according to an example.

Referring to FIG. 1, a portable electronic device 1 may be a portable electronic device in which a plurality of camera modules 500 and 1000 are mounted, such as a mobile communications terminal, a smartphone, or a tablet personal computer (PC).

In the present example, the plurality of camera modules 500 and 1000 may be mounted in the portable electronic device 1. Although it is illustrated in FIG. 1 that the plurality of camera modules 500 and 1000 are arranged to be aligned in a horizontal direction, but may be arranged to be aligned in a vertical direction or in a diagonal direction.

The portable electronic device 1 may include only the camera module 1000 having a zoom function.

At least one of the plurality of camera modules 500 and 1000 may be the camera module 1000 according to an example in the present disclosure, which will be described below with reference to a plurality of drawings, including FIG. 2. That is, in a case in which a portable electronic device has a dual camera module, at least one of two camera modules may be provided as the camera module 1000 according to an example in the present disclosure.

According to various examples, a camera module and a portable electronic device including the same can be implemented to have an autofocusing function, a zoom function, an optical image stabilizing function, and the like, while having a simple structure and a reduced size. In addition, power consumption can be minimized.

The camera module 1000 having a zoom function may be mounted in the portable electronic device 1 to capture an image of a subject.

The camera module 1000 may include a plurality of lenses, and an optical axis (a Z axis) of each of the lenses may be directed in a direction perpendicular to a thickness direction (a Y-axis direction or a direction from a front surface to a rear surface of the portable electronic device or vice versa) of the portable electronic device 1.

As an example, the optical axis (the Z axis) of each of the plurality of lenses included in the camera module 1000 may be formed in a width direction or a length direction of the portable electronic device 1.

Therefore, even though the camera module 1000 has an autofocusing (AF) function, a zoom function, an optical image stabilizing (hereinafter referred to as OIS) function, and the like, a thickness of the portable electronic device 1 may not be increased. Accordingly, the portable electronic device 1 may have a small thickness.

In a case in which two camera modules are used, light incident holes in the two camera modules may be disposed to be as close to each other as possible.

The first camera module 1000 and the second camera module 500 may have different angles of view.

The first camera module 1000 may be configured to have a relatively narrow angle of view (e.g., a telephoto camera), and the second camera module 500 may be configured to have a relatively wide angle of view (e.g., a wide-angle camera). The first camera module 1000 may be a camera module to be described below with reference to the drawings including FIG. 2.

As an example, the first camera module 1000 may be formed to have an angle θ1 of view in a range of 9° to 35°, and the second camera module 500 may be formed to have an angle θ2 of view in a range of 60° to 120°.

By designing the two camera modules to have different angles of view as described above, images of a subject may be captured at various depths, and the captured images may be combined with each other or may overlap each other to implement various images.

The camera module 1000 may have an AF function, a zoom function, and an OIS function. In particular, the camera module 1000 may be implemented to have a high-performance zoom function by implementing the plurality of lens modules to be movable in an optical axis direction with a long stroke.

Since the camera module 1000 including the AF function, the zoom function, the OIS function, and the like, needs to include various components, the camera module 1000 may have a larger size than a general camera module.

The increase in size of the camera module 1000 may cause a problem in reducing a size of the portable electronic device 1 in which the camera module 1000 is mounted.

For example, the camera module may have an increased number of lenses stacked for the zoom function. When the plurality of lenses is stacked in the thickness direction of the portable electronic device, a thickness of the portable electronic device may also increase according to the number of lenses stacked. Therefore, unless the thickness of the portable electronic device is increased, the number of lenses stacked may not be sufficiently secured, resulting in a deterioration in zoom performance.

In addition, an actuator moving a group of a plurality of lens in an optical axis direction or in a direction perpendicular to the optical axis needs to be installed in order to implement the AF function, the zoom function, and the OIS function. When the optical axis (the Z axis) of the lens group is formed in the thickness direction of the portable electronic device, the actuator moving the lens group also needs to be installed in the thickness direction of the portable electronic device. Accordingly, a thickness of the portable electronic device may increase.

However, since the camera module 1000 is disposed so that the optical axis (the Z axis) of each of the plurality of lenses is perpendicular to the thickness direction of the portable electronic device 1, the portable electronic device 1 may have a small thickness even though the camera module 1000 having the AF function, the zoom function, and the OIS function is mounted therein.

Figure 2:
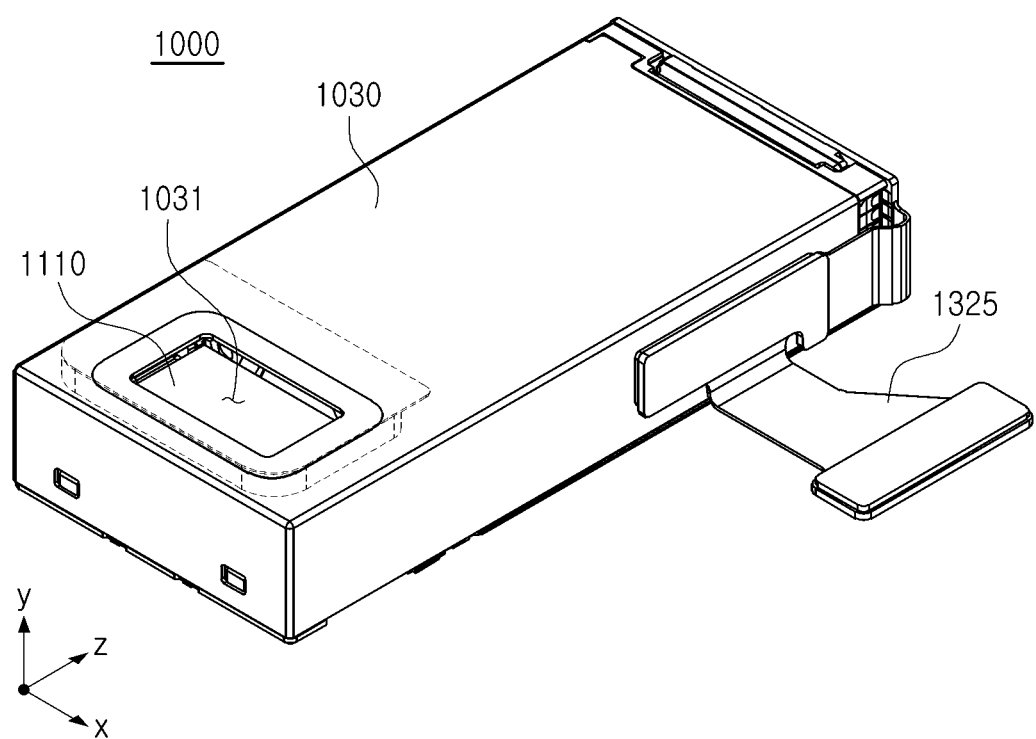
FIG. 2 is a perspective view of a camera module according to an example.
Figure 3:
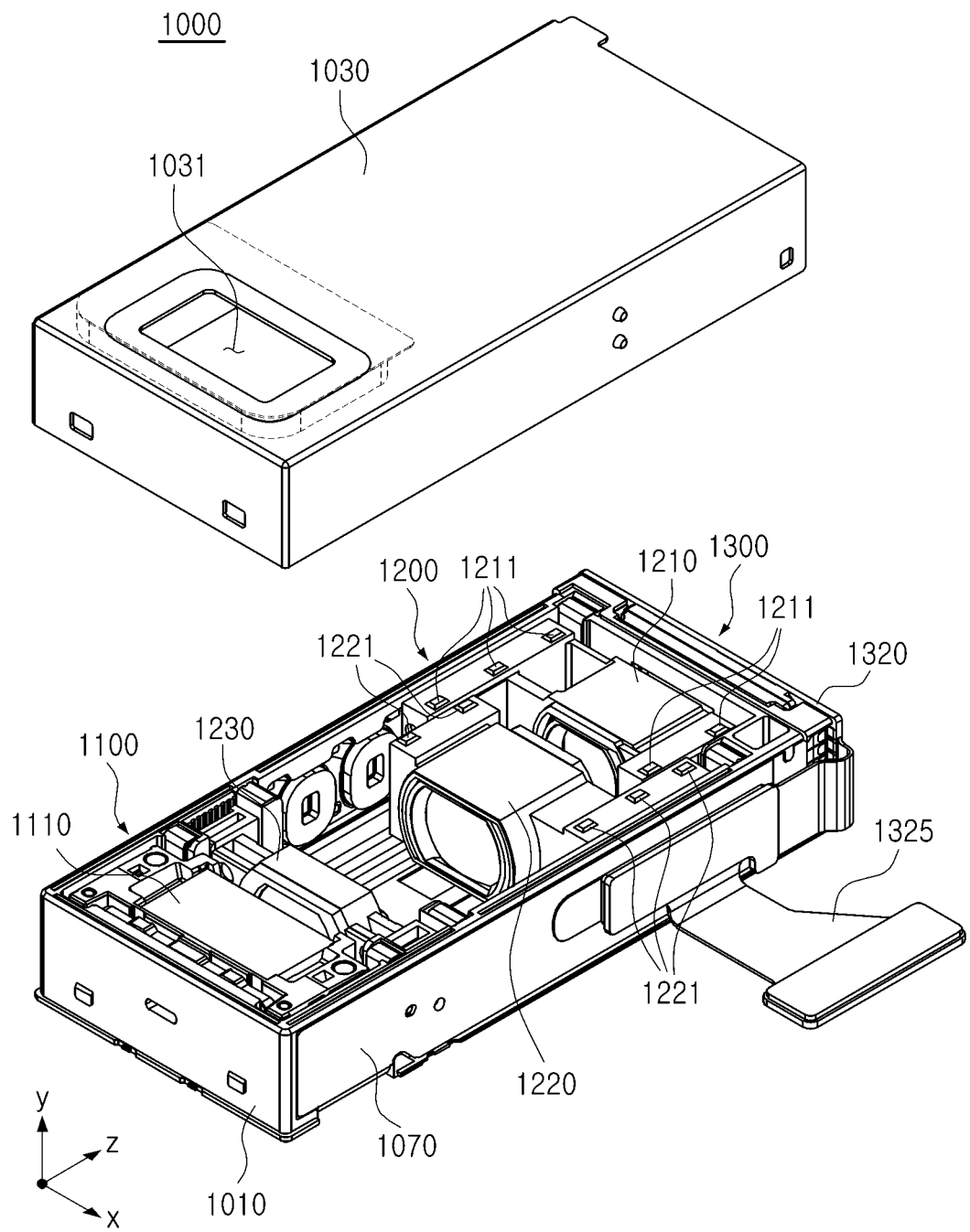
FIG. 3 is an exploded perspective view of FIG. 2 when only a cover is disassembled from the camera module.

FIG. 2 is a perspective view of the camera module according to an example, and FIG. 3 is an exploded perspective view of FIG. 2 when only a cover is disassembled from the camera module.

Referring to FIGS. 2 and 3, the camera module 1000 may include a reflection module 1100, a lens module 1200, and an image sensor module 1300 provided in a housing 1010.

The reflection module 1100 may be configured to change a propagation direction of light. As an example, a propagation direction of light incident through an opening 1031 of a cover 1030 covering the camera module 1000 from above may be changed through the reflection module 1100 so that the light is directed toward the lens module 1200. To this end, the reflection module 1100 may include an optical path changing member 1110 that changes a path of light (e.g., reflects light). As the optical path changing member 1110, a mirror, a prism, a beam splitter, or the like may be variously applied.

For example, a path of light incident to the camera module 1000 in the thickness direction (the Y-axis direction) of the camera module 1000 may be changed by the reflection module 1100 to approximately coincide with the optical axis direction (the Z-axis direction). Then, the light of which the path is changed is incident to the lens module 1200.

The lens module 1200 may include a plurality of lenses through which the light of which the propagation direction is changed by the reflection module 1100 passes. The lens module 1200 may include first, second, and third lens modules 1210, 1220, and 1230. Although the present example includes lens modules, the number of lens modules may generally be two or more.

The autofocusing (AF) function and the zoom function may be implemented by moving at least one of the plurality of lens modules 1210, 1220, and 1230 in the optical axis direction (the Z-axis direction).

All of the three lens modules 1210, 1220, and 1230 may move in the optical axis direction, or any one (for example, lens module 1230) of the three lens modules 1210, 1220, and 1230 may be fixed so as not to move in the optical axis direction, and the autofocusing (AF) function and the zoom function may be implemented by the moving lens modules (for example, lens modules 1210 and 1220).

Figure 5:
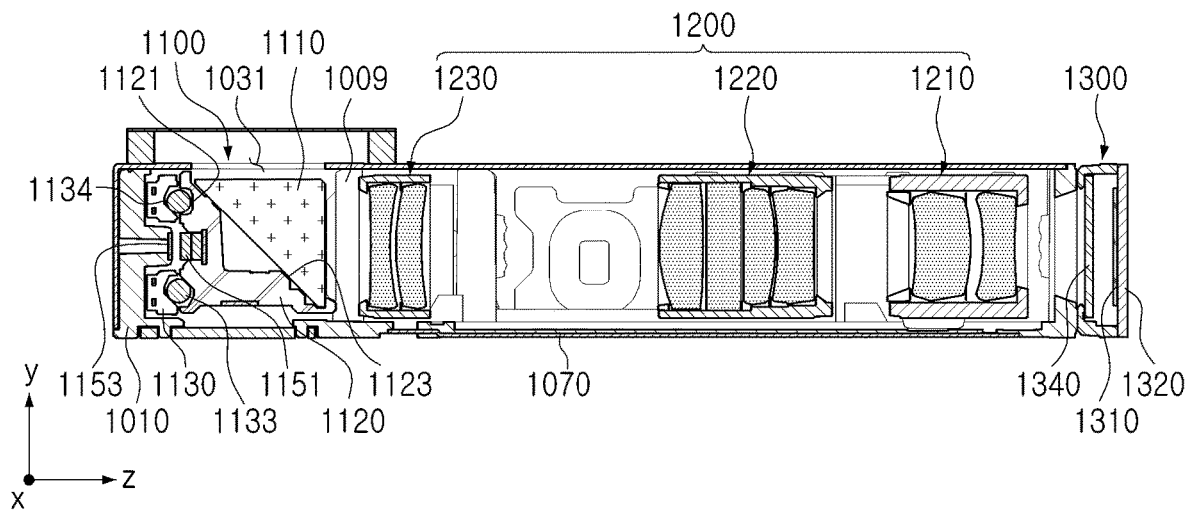
FIG. 5 is a transverse cross-sectional view of the camera module according to an example.
Figure 6:
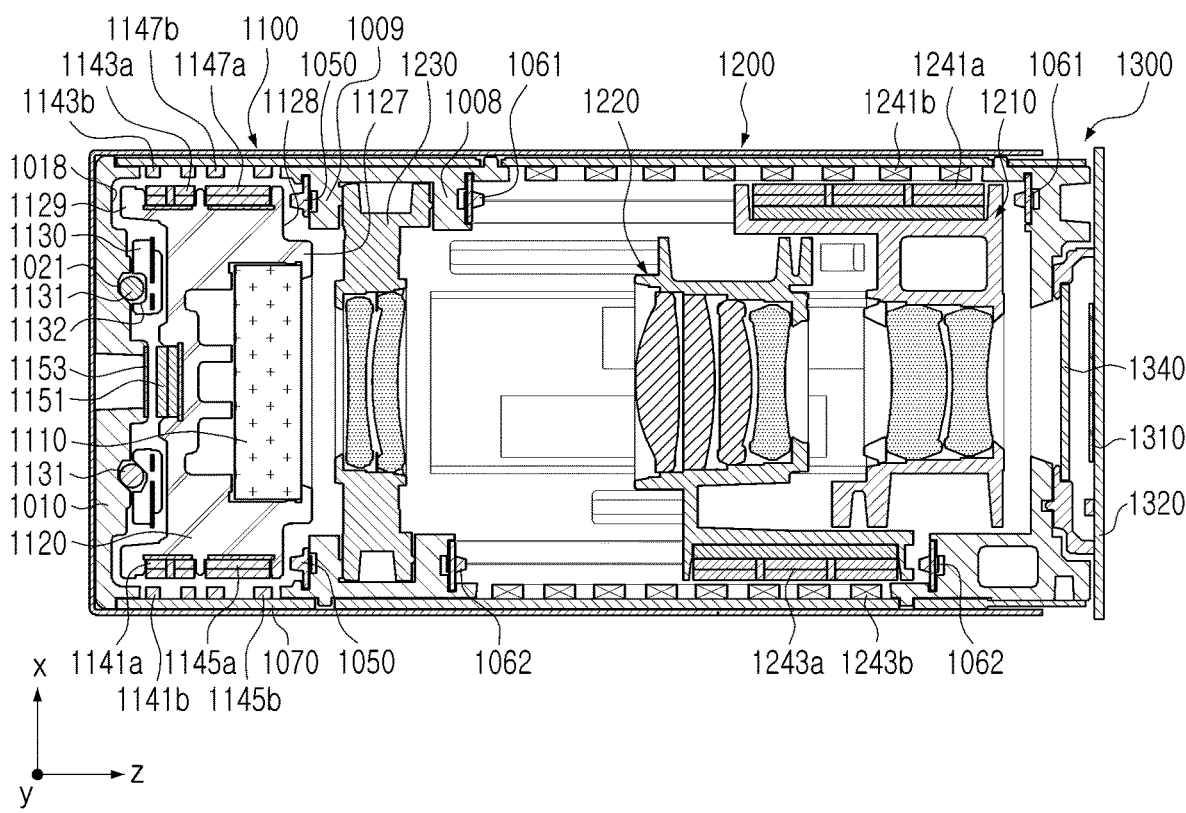
FIG. 6 is a plan cross-sectional view of the camera module according to an example.
Figure 7:
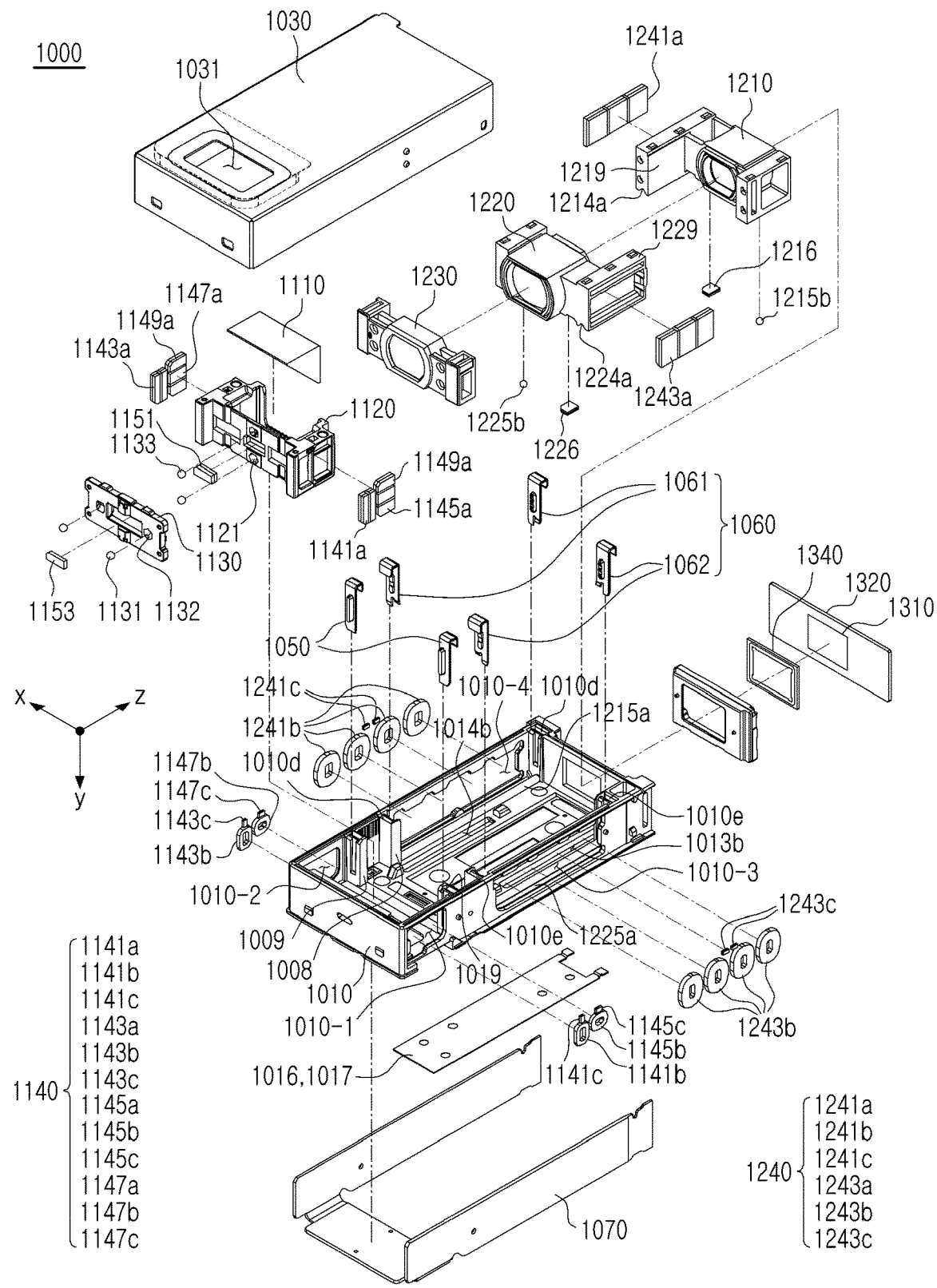
FIG. 7 is an exploded perspective view of the camera module according to an example.
Figure 8:
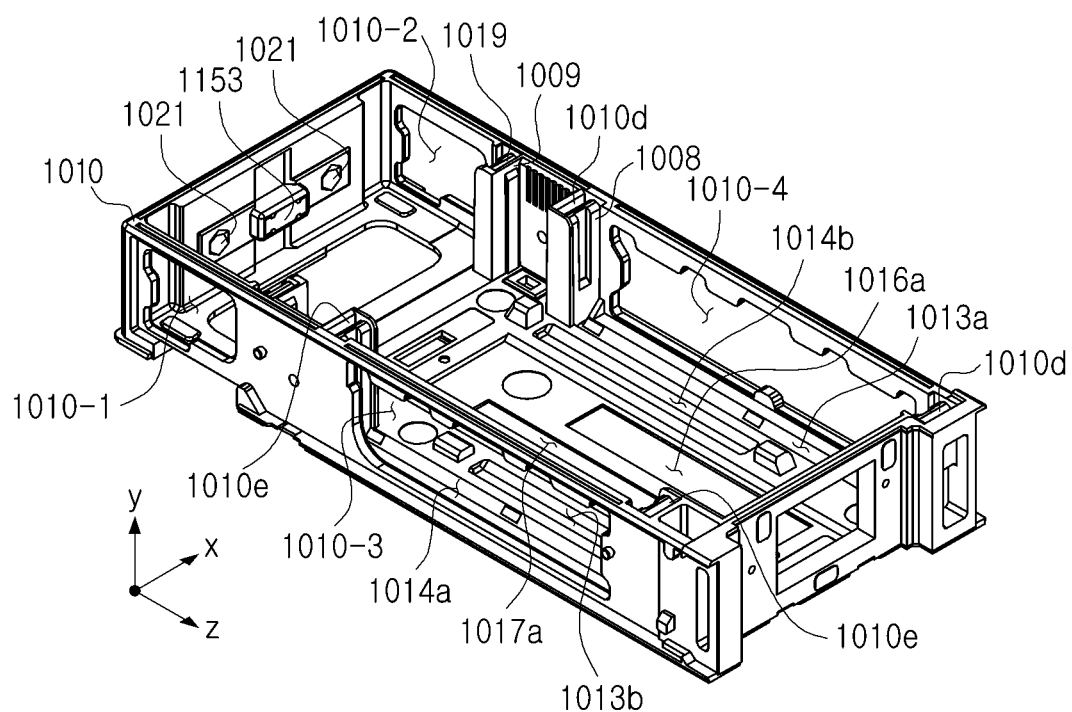
FIG. 8 is a perspective view of a housing of the camera module according to an example.

The image sensor module 1300 may include an image sensor 1310 (see FIG. 5, for example) converting the light passing through the plurality of lenses into an electrical signal and a printed circuit board 1320 on which the image sensor 1310 is mounted.

The image sensor module 1300 may include an optical filter 1340 (see FIG. 5, for example) filtering the light incident thereto after passing through the lens module 1200. The optical filter 1340 may be an infrared cut-off filter.

In an internal space of the housing 1010, the reflection module 1100 may be provided in front of the lens module 1200 and the image sensor module 1300 may be provided behind the lens module 1200.

A first driving unit 1140 of the reflection module 1100, a second driving unit 1240 of the lens module 1200, the printed circuit board 1320 and a main board 1070 each being configured to supply power to the image sensor 1310 of the image sensor module 1300 or transmit and receive control signals, and a single terminal 1325 connected to both the boards 1320 and 1070 may be provided in the internal space of the housing 1010.

Figure 4A:
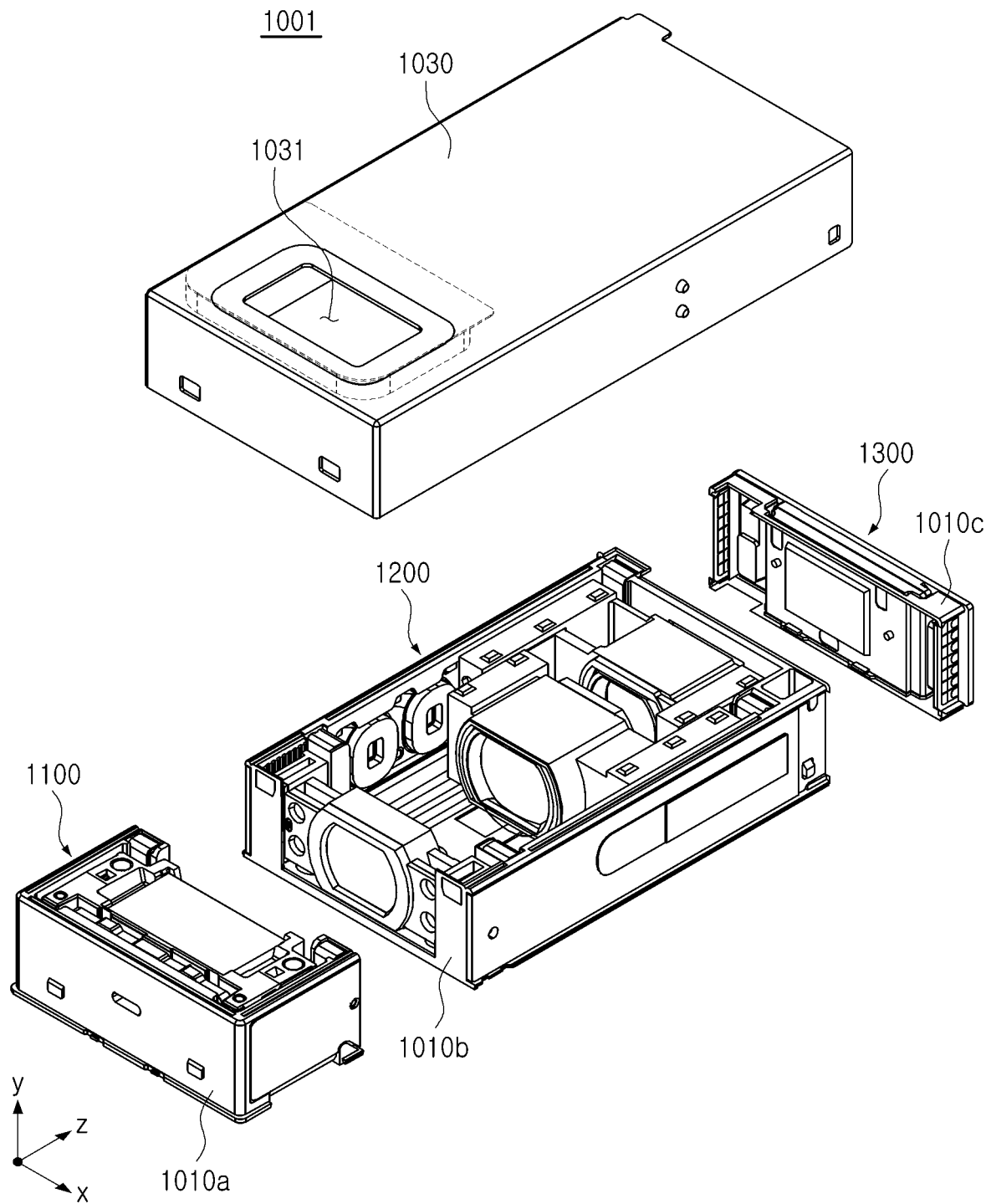
FIGS. 4A and 4B are perspective views of camera modules according to other examples.
Figure 4B:
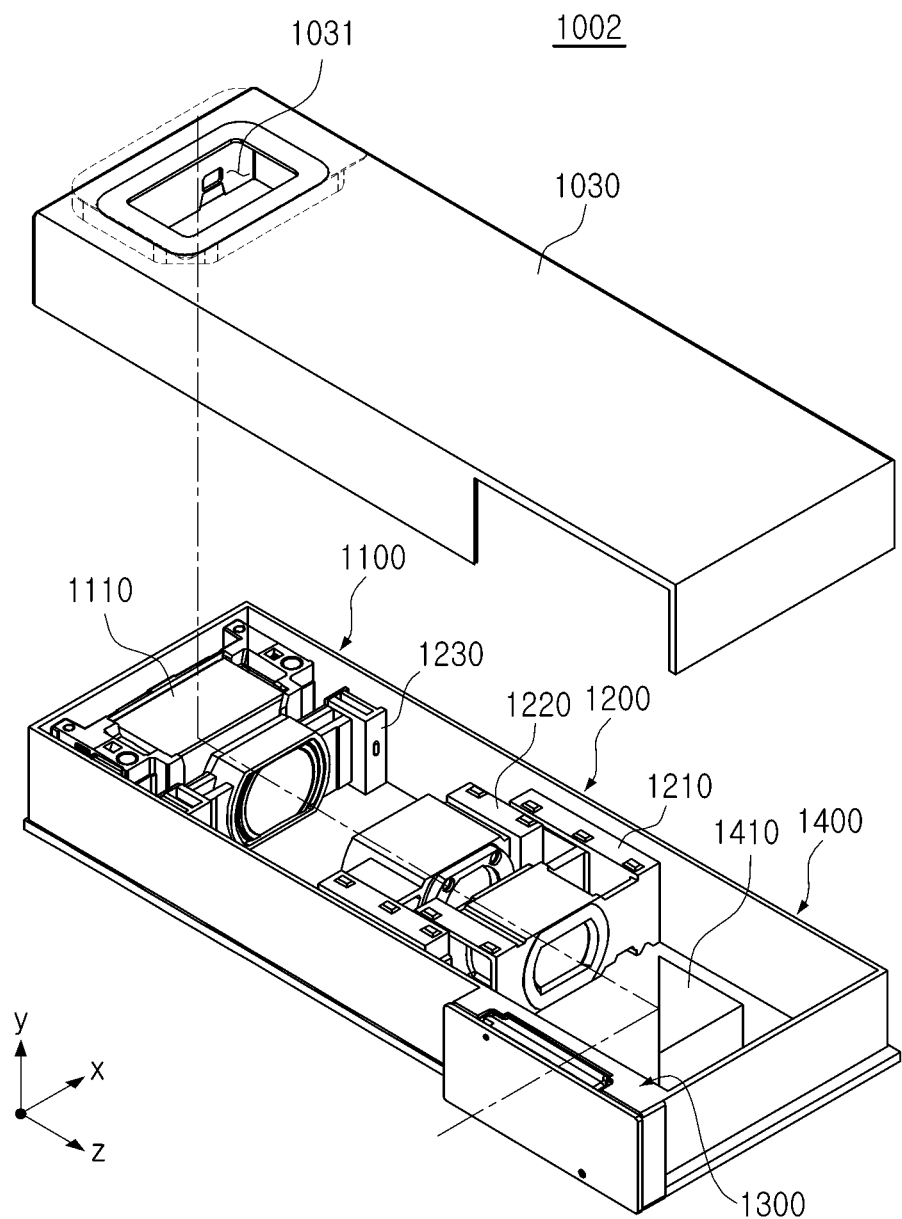

FIGS. 4A and 4B are perspective views of camera modules according to other examples.

Referring to FIG. 4A, a camera module 1001 according to another example may have the same basic structure as the camera module 1000, except that a housing may be provided separately for each module.

Hereinafter, different reference numerals (e.g., "1000" in an example and "1001" or "1002" in other examples) may be used for the respective camera modules, for the purpose of convenience in describing the various examples, but all of the camera modules denoted by those reference numerals fall within the scope of the camera module denoted by "1000" according to the present example.

That is, both the camera modules 1000 and 1001 according to the present example include a reflection module 1100, a lens module 1200, and an image sensor module 1300, but in the above-described camera module 1000 according to an example, all of the reflection module 1100, the lens module 1200, and the image sensor module 1300 may be provided in a single housing 1010, or only the image sensor module 1300 may be provided separately.

In contrast, in the camera module 1001 according to another example, the reflection module 1100 and the lens module 1200 may be provided in separate housings. That is, the reflection module 1100 may be provided in a first housing 1010a, and the lens module 1200 may be provided in a second housing 1010b.

The image sensor module 1300 may be provided in the second housing 1010b together with the lens module 1200, or may be separately provided in a third housing 1010c.

The first to third housings 1010a to 1010c may be connected to each other, in a state in which they are sequentially aligned in the optical axis direction (the Z-axis direction), in various ways, for example, by bonding them to each other using an adhesive or by mechanically coupling them to each other using hooks.

The cover 1030 may cover upper portions of all the first to third housings 1010a to 1010c coupled to each other together. Although not illustrated, the cover 1030 may also be provided separately for each housing or selectively cover only two housings together.

The present example covers both a structure where the housing 1010 is in an integral type and a structure where the housing 1010 includes a plurality of housings 1010a, 1010b, and 1010c separately provided for the respective modules. In describing each component in detail below, it will be basically assumed that the housing 1010 has an integral structure, but even a structure where the housing has a separated structure falls within the scope of the present disclosure even if it is not explicitly described that the housing is in a separated type.

Referring additionally to FIG. 4B, a camera module 1002 according to another example may have the same basic structure as the camera module 1000, except that an additional optical path changing member 1410 is provided in the housing 1010.

That is, both the camera modules 1000 and 1002 include a reflection module 1100, a lens module 1200, and an image sensor module 1300, but in the above-described camera module 1000, a single reflection module 1100 may be provided in a single housing 1010.

In contrast, the camera module 1002 may include one or more second reflection modules 1400 capable of additionally changing an optical path as well as the first reflection module 1100.

The OIS function may be provided in any one of the plurality of reflection modules 1100 and 1400, or each of the reflection modules 1100 and 1400 may take charge of a part of the OIS function such that the OIS function is shared by the reflection modules 1100 and 1400. For example, the optical path changing member of the first reflection module 1100 may be driven to rotate with respect to a first axis perpendicular to the optical axis, and the optical path changing member 1410 of the second reflection module 1400 may be driven to rotate with respect to a second axis perpendicular to both the optical axis and the first axis.

The light incident to the camera module 1002 may be incident to the image sensor module 1300 after the light path is changed at least twice through the reflection module 1100 and the reflection module 1400.

Referring additionally to FIGS. 5 through 15, the camera module 1000 may include the reflection module 1100, the lens module 1200, and the image sensor module 1300 provided in the housing 1010.

The reflection module 1100, the lens module 1200, and the image sensor module 1300 may be sequentially disposed from one side to the other side of the housing 1010 in the housing 1010.

The housing 1010 may have an internal space so that the reflection module 1100, the lens module 1200, and the image sensor module 1300 are disposed therein.

For example, as illustrated in the drawings, both the reflection module 1100 and the lens module 1200 may be disposed in the internal space of the housing 1010. However, the configuration of the housing 1010 is not limited thereto. For example, separate housings in which the reflection module 1100 and the lens module 1200 are disposed, respectively, may be connected to each other as described above.

The housing 1010 may be covered by the cover 1030 so that the light is blocked and the internal space of the housing 1010 is not viewed.

The cover 1030 may have the opening 1031 to allow light to be incident therethrough, and a propagation direction of the light incident through the opening 1031 may be changed by the reflection module 1100, such that the light is incident to the lens module 1200. The cover 1030 may be integrally provided to entirely cover the housing 1010, or may be provided as separate members covering the reflection module 1100 and the lens module 1200, respectively.

The reflection module 1100 may include the optical path changing member 1110 reflecting light. The optical path changing member 1110 may be a prism, a beam splitter, a mirror, or the like.

The light incident to the lens module 1200 may be converted into and stored as an electrical signal by the image sensor 1310 after passing through a plurality of lenses (e.g., lenses included in three lens modules 1210, 1220, and 1230).

The reflection module 1100 may be provided in a front portion of the internal space of the housing 1010, that is, at a position close to the opening 1031 through which light is incident, and the lens module 1200 may be provided in a rear portion of the internal space of the housing 1010, that is, at a position close to the image sensor 1310 where the light forms an image.

A space in which the lens module 1200 is disposed may be separated by first protruding walls 1009 in the housing 1010. The first protruding walls 1009 may protrude toward the internal space from side walls of the housing 1010 on both sides of the housing 1010.

The reflection module 1100 may include a rotation holder 1120, and the housing 1010 and the rotation holder 1120 facing each other may be provided with a first magnetic material 1151 and a second magnetic material 1153 on respective surfaces thereof facing each other, and the rotation holder 1120 may be supported by (adhere to) the housing 1010 by a magnetic force between the first magnetic material 1151 and the second magnetic material 1153.

The first magnetic material 1151 and the second magnetic material 1153 may be a pulling yoke and a pulling magnet. For example, the first magnetic material 1151 and the second magnetic material 1153 may selectively be a pulling yoke and a pulling magnet, or both the first magnetic material 1151 and the second magnetic material 1153 may be pulling magnets.

First ball members 1131, a rotation plate 1130, and second ball members 1133 may be provided between an inner wall surface of the housing 1010 and the rotation holder 1120.

Dampers 1050 fitted into the first protruding walls 1009 of the housing 1010 may be provided.

The dampers 1050 may be fitted into the first protruding walls 1009 of the housing 1010.

Figure 29A:
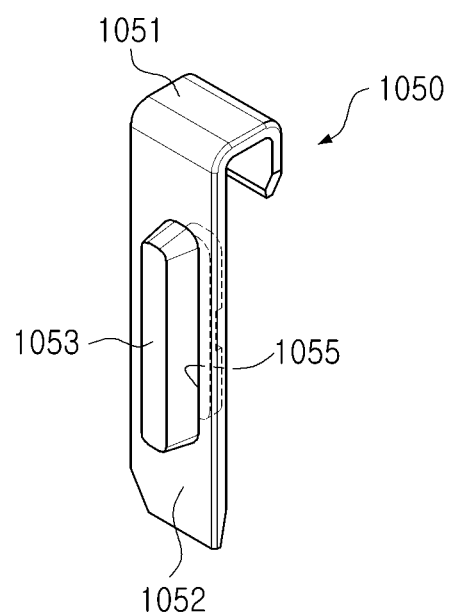
FIG. 29A is a perspective view illustrating the damper according to an example.

For example, as illustrated in FIG. 29A, each of the dampers 1050 may include a frame 1051 fitted into the first protruding wall 1009 and an extension portion 1052 extending from the frame 1051. A damping material 1053 may be provided on the extension portion 1052 to protrude toward the rotation holder 1120 in the optical axis direction.

The damping material 1053 may be inserted into a through-hole 1055 provided in the extension portion 1052 or may be attached to the extension portion 1052 using an adhesive. The damping material 1053 may be any material as long as it has elasticity, such as urethane, silicone, epoxy, or poly.

Each of the first protruding walls 1009 of the housing 1010 may have an insertion groove 1019 into which the frame 1051 is fitted. The hook-shaped frame 1051 may be fitted into the first protruding wall 1009 downward from above the first protruding wall 1009, and the hook-shaped frame 1051 may be caught by an upper portion of the first protruding wall 1009 for fixation not to move (press-fitting or slide coupling). Furthermore, an adhesive may be applied between the frame 1051 and the housing 1010 to further couple the frame 1051 and the housing 1010 to each other by bonding.

The damping material 1053 may be provided to be fitted into the through-hole 1055 provided in the extension portion 1052 (alternatively, the damping material 1053 may be attached onto one surface or both surfaces of the extension portion 1052 by bonding using an adhesive), and the damping material 1053 may be provided to protrude from one surface or both surfaces of the extension portion 1052. Then, the damping material 1053 may serve as a damper absorbing a shock of the rotation holder 1120 or a stopper restricting a movement distance of the rotation holder 1120.

The dampers 1050 may serve to restrict a movement range of the rotation holder 1120 or to absorb a shock of the rotation holder 1120. A space may be provided between the dampers 1050 and the rotation holder 1120 so that the rotation holder 1120 is smoothly rotated.

The reflection module 1100 may change a path of light incident thereto through the opening 1031. When an image is captured or a video is recorded, the image may be blurred or the video may be shaken due to a user's handshake or the like. In this case, the reflection module 1100 may correct the user's handshake or the like by moving the rotation holder 1120 on which the optical path changing member 1110 is mounted.

For example, when shaking occurs due to a user's handshake or the like at the time of capturing an image or recording a video, the shaking may be compensated for by providing a relative displacement corresponding to the shaking to the rotation holder 1120.

In addition, since the OIS function may be implemented by moving the rotation holder 1120, which has a relatively light weight, power consumption may be minimized.

That is, in order to implement an OIS function, optical image stabilization may be performed by moving the rotation holder 1120 in which the optical path changing member 1110 is provided, without moving the lens module including a plurality of lenses or the image sensor, to change a propagation direction of light.

The reflection module 1100 may include the rotation holder 1120 provided in a supported manner while facing the housing 1010, the optical path changing member 1110 mounted in the rotation holder 1120, and the first driving unit 1140 moving the rotation holder 1120. The rotation plate 1130 may be disposed between the housing 1010 and the rotation holder 1120.

The optical path changing member 1110 may change a propagation direction of light. For example, the optical path changing member 1110 may be a mirror, a prism, a splitter, or the like, which reflects the light (the optical path changing member 1110 is illustrated as a prism in the drawings associated with an exemplary embodiment for convenience of explanation).

The optical path changing member 1110 may be fixed to the rotation holder 1120. The rotation holder 1120 may have a mounting surface 1123 on which the optical path changing member 1110 is mounted.

The mounting surface 1123 of the rotation holder 1120 may be an inclined surface so that the path of the light is changed. For example, the mounting surface 1123 may be a surface inclined at an angle in the range of 30 to 60° with respect to the optical axis (the Z axis) of each of the plurality of lenses. The inclined surface of the rotation holder 1120 may face the opening 1031 of the cover 1030 through which light is incident.

The rotation holder 1120 on which the optical path changing member 1110 is mounted may be movably accommodated in the internal space of the housing 1010. For example, the rotation holder 1120 may be accommodated in the housing 1010 to be rotatable around the first axis and around the second axis. Here, both the first axis and the second axis may be perpendicular to the optical axis (the Z axis), and the first axis and the second axis may be perpendicular to each other. For example, the first axis may be parallel to the X axis illustrated in the drawings, and the second axis may be parallel to the Y axis illustrated in the drawings.

The rotation holder 1120 may be provided in a supported manner while facing the housing 1010, with first ball members 1131 and second ball members 1133 interposed between the rotation holder 1120 and the housing 1010, the first ball members 1131 being aligned along the first axis and the second ball members 1133 being aligned along the second axis so that the rotation holder 1120 is smoothly rotated using each of the first axis and the second axis as an axis of rotation.

As an example, it is illustrated in the drawings that two first ball members 1131 are disposed to be spaced apart from each other along the first axis and two second ball members 1133 are disposed to be spaced apart from each other along the second axis. The rotation holder 1120 may be rotated with respect to the first axis and the second axis by the first driving unit 1140, which will be described below.

The first ball members 1131 and the second ball members 1133 may be provided on front and rear surfaces of the rotation plate 1130, respectively. Alternatively, the first ball members 1131 and the second ball members 1133 may be provided on the rear and front surfaces of the rotation plate 1130 by reversing their positions. That is, the first ball members 1131 may be aligned along the second axis, and the second ball members 1133 may be aligned along the first axis. For convenience of explanation, the following description will be made based on the structure illustrated in the drawings. The rotation plate 1130 may be provided between the rotation holder 1120 and an inner side surface of the housing 1010.

The rotation holder 1120 may be supported by the housing 1010 via the rotation plate 1130 by virtue of the magnetic force between the first magnetic material 1151 provided on the rotation holder 1120 and the second magnetic material 1153 provided on the housing 1010.

The rotation holder 1120 may include first extension portions 1129 extending on both sides thereof in a direction toward a surface thereof supported by the housing 1010 (e.g., the optical axis direction).

The rotation plate 1130 may be disposed to be positioned between the first extension portions 1129 provided on both sides. The housing 1010 may include lead-in portions 1018 that are lead-in in the optical axis direction (the Z-axis direction) on an inner surface thereof to secure spaces in which the first extension portions 1129 easily move.

According to such a structure, as will be described below, it is possible to secure spaces for easily providing two 1-1st magnets 1141*a* and 1143*a* and two 1-2nd magnets 1145*a* and 1147*a* arranged in parallel to each other on side surfaces of the rotation holder 1120, and it is also possible to provide a space in which a zoom driver may become sufficiently long by disposing the rotation holder 1120 and the rotation plate 1130 to partially overlap each other in the optical axis direction (the Z-axis direction).

The rotation holder 1120 may include recess portions 1128 in a direction in which the optical path changing member 1110 is mounted toward the image sensor (e.g., a direction facing the first protruding walls 1009 of the housing 1010) to minimize a space occupied thereby in the optical axis direction (the Z-axis direction), and a second extension portion 1127 protruding toward the image sensor in the optical axis direction (the Z-axis direction) while the optical path changing member 1110 is mounted in a portion other than the recess portions 1128.

Then, the recess portions 1128 may face the first protruding walls 1009 of the housing 1010 in the optical axis direction (the Z-axis direction), and the second extension portion 1127 may be partially disposed at the same positions in the optical axis direction (the Z-axis direction) as the first protrusion walls 1009 (that is, the second extension portion 1127 and the first protruding walls 1009 may be disposed to overlap each other in the X-axis direction), or the second extension portion 1127 may be disposed adjacent to the first protrusion walls 1009 in the optical axis direction (the Z-axis direction).

The second extension portion 1127 may be provided to be smaller than a distance in the X-axis direction between ends of the opposite first protruding walls 1009 protruding from both sides of the housing 1010 inside the housing 1010. That is, a width of the second extension portion 1127 in the X-axis direction may be smaller than the distance in the X-axis direction between the ends of the opposite first protruding walls 1009, and thus, the second extension portion 1127 may be disposed between the opposite first protruding walls 1009.

By providing the recess portions 1128 on both sides of the rotation holder 1120 as described above, the rotation holder 1120 may substantially occupy a minimum space in the optical axis direction (the Z-axis direction), and the rotation holder 1120 may be disposed at the same position in the optical axis direction (the Z-axis direction) as the first protruding walls 1009 or disposed adjacent to the first protruding walls 1009 in the optical axis direction (the Z-axis direction). Therefore, it is possible to additionally provide a space in which a zoom driver may become sufficiently long.

Guide grooves 1132 and 1134 may be provided in the front and rear surfaces of the rotation plate 1130 to insert the first ball members 1131 and the second ball members 1133 thereinto, and the guide grooves 1132 and 1134 may include first guide grooves 1132 into which the first ball members 1131 are partially inserted and second guide grooves 1134 into which the second ball members 1133 are partially inserted.

The housing 1010 may have third guide grooves 1021 into which the first ball members 1131 are partially inserted, and the rotation holder 1120 may have fourth guide grooves 1121 into which the second ball members 1133 are partially inserted.

The first guide grooves 1132, the second guide grooves 1134, the third guide grooves 1021, and the fourth guide grooves 1121 described above may be hemispherical or polygonal shape (polyhedral or poly-pyramidal) so that the first ball members 1131 and the second ball members 1133 easily rotate.

The first ball members 1131 and the second ball members 1133 may act as bearings by rolling or sliding in the first guide grooves 1132, the second guide grooves 1134, the third guide grooves 1021, and the fourth guide grooves 1121.

Figure 13:
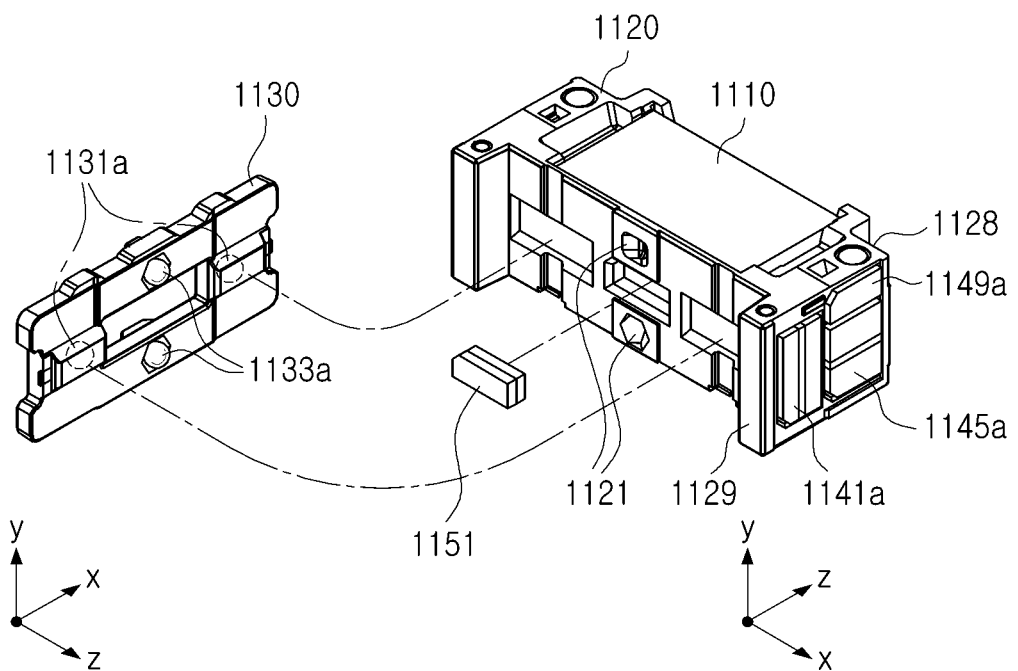
FIG. 13 illustrates exploded perspective views of a rotation plate and a rotation holder of the camera module according to another example.
Figure 14:
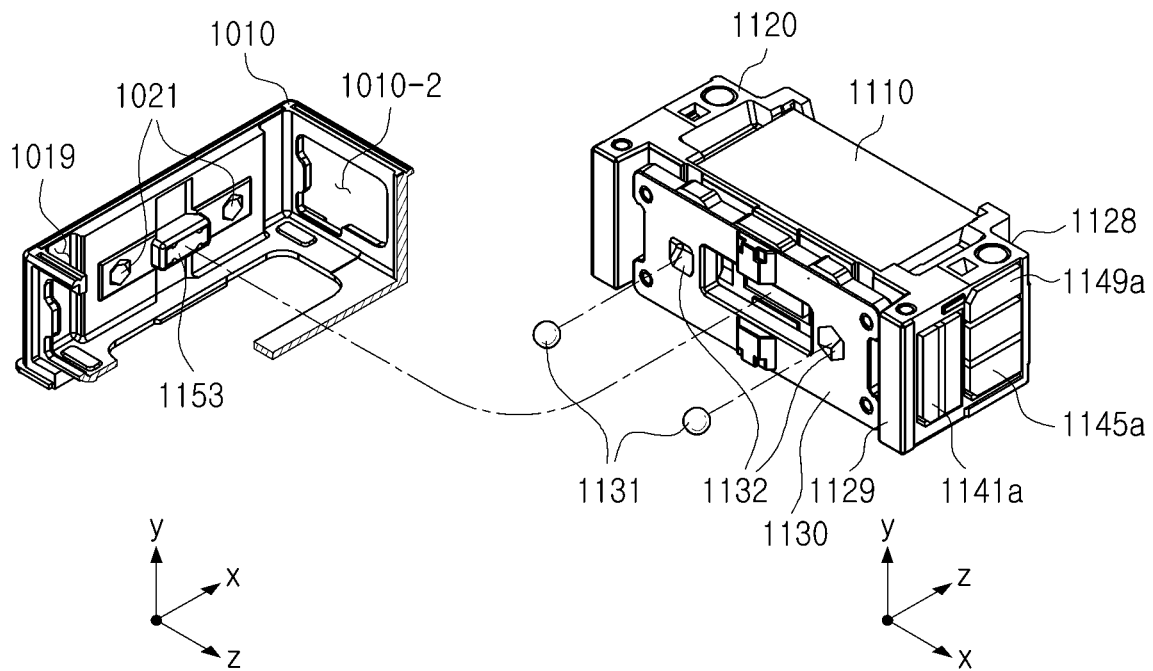
FIG. 14 illustrates exploded perspective views of the housing and the rotation holder in the camera module according to an example.
Figure 15:
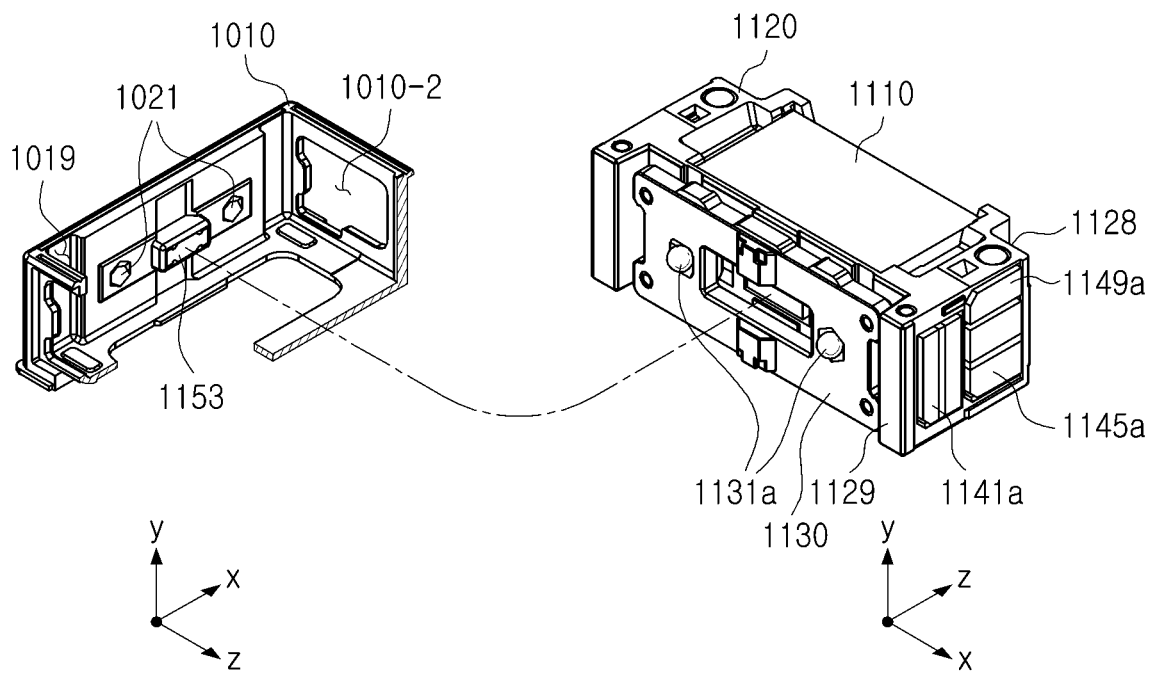
FIG. 15 illustrates exploded perspective views of the housing and the rotation holder in the camera module according to another example.
Figure 16:
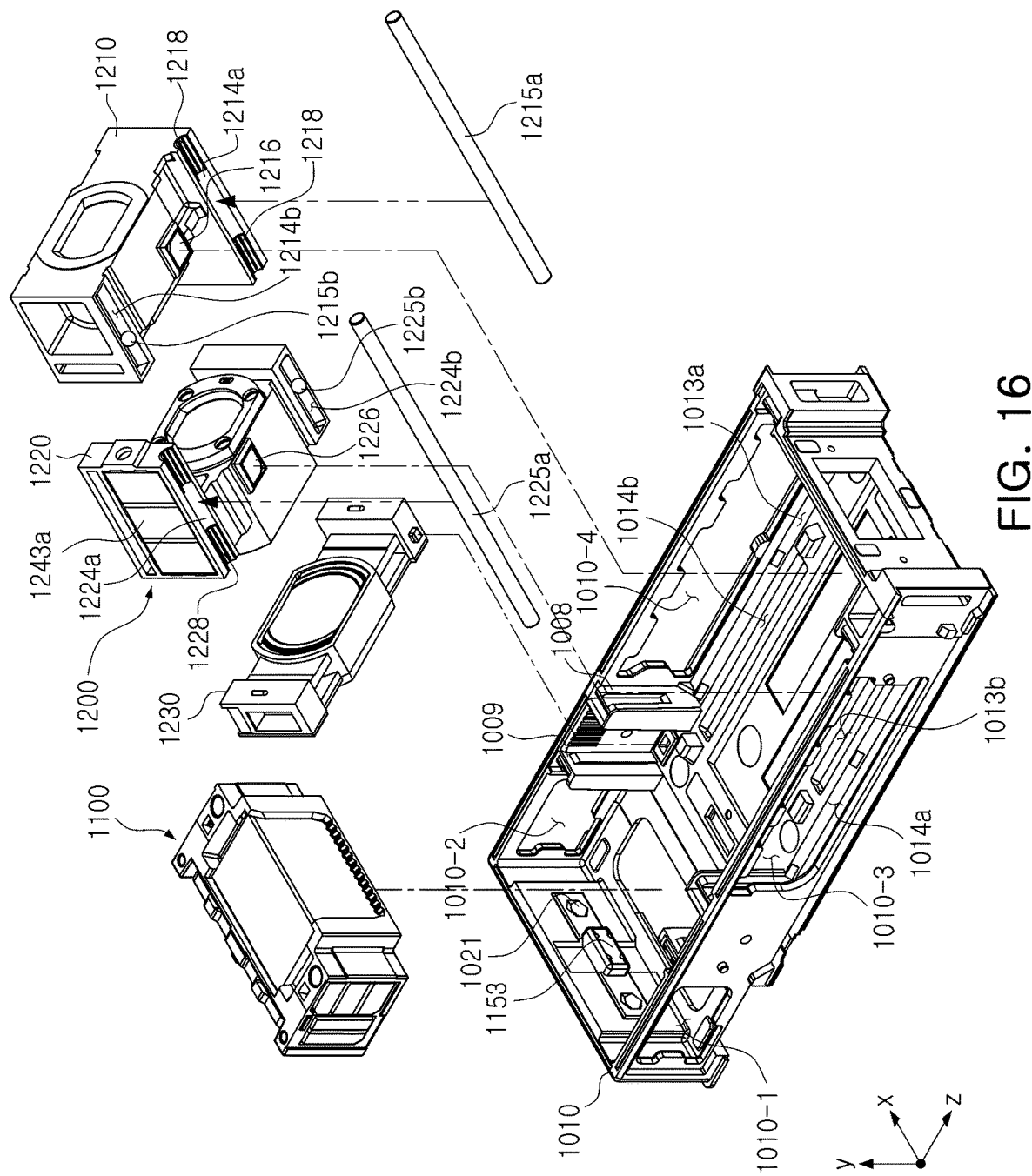
FIG. 16 illustrates exploded perspective views of the housing and the lens module according to an example.

As illustrated in FIGS. 13 and 15, the first ball members 1131*a* and second ball members 1133*a* may be fixedly provided on both surfaces of the rotation plate 1130 or on respective one surfaces of the housing 1010 and the rotation holder 1120 facing the rotation plate 1130.

The first driving unit 1140 may generate a driving force so that the rotation holder 1120 is rotatable with respect to two axes.

As an example, the first driving unit 1140 may include a plurality of magnets 1141*a*, 1143*a*, 1145*a*, and 1147*a*, and a plurality of coils 1141*b*, 1143*b*, 1145*b*, and 1147*b* disposed to face the plurality of magnets 1141*a*, 1143*a*, 1145*a*, and 1147*a*.

In addition, the plurality of magnets 1141*a*, 1143*a*, 1145*a*, and 1147*a* may be provided separately on both side surfaces, that is, surfaces parallel to a Y-Z plane, of the rotation holder 1120. In this way, the plurality of magnets 1141*a*, 1143*a*, 1145*a*, and 1147*a* and the plurality of coils 1141*b*, 1143*b*, 1145*b*, and 1147*b* may be disposed on the side surfaces of the rotation holder 1120 and on surfaces of the housing 1010 facing the side surfaces of the rotation holder 1120, with none of the plurality of magnets 1141*a*, 1143*a*, 1145*a*, and 1147*a* and the plurality of coils 1141*b*, 1143*b*, 1145*b*, and 1147*b* being disposed on a bottom surface or a top surface of the housing 1010. Therefore, it is possible to reduce an overall thickness (i.e., a length in the Y-axis direction) of the camera module 1000, which is advantageous, referring to FIG. 1, in that the camera module 1000 can be easily installed even when the portable electronic device 1 has a small thickness.

As will be described below, all of a plurality of magnets 1241*a* and 1243*a* and a plurality of coils 1241*b* and 1243*b* included in the second driving unit 1240 may also be provided on the side surfaces of the housing 1010, which is also helpful in reducing an overall thickness (i.e., a length in the Y-axis direction) of the camera module 1000.

As illustrated in FIG. 1, the camera module 1000 may be disposed so that the bottom surface of the housing 1010 faces a display (screen) of the portable electronic device 1. When the first driving unit 1140 or the second driving unit 1240 is provided on the side surfaces of the housing 1010, it is possible to suppress a magnetic flux leaked in a direction toward the display (screen) as much as possible, thereby minimizing an influence of the magnetic flux on the function of the portable electronic device 1.

Among the plurality of magnets, one of the 1-1st magnets 1141*a* and 1143*a* and one of the 1-2nd magnets 1145*a* and 1147*a* may be provided in parallel to each other on one side surface of the rotation holder 1120. The 1-1st magnets 1141*a* and 1143*a* and the 1-2nd magnets 1145*a* and 1147*a* may be magnetized so that surfaces thereof facing the coils have N poles and S poles in a direction perpendicular to each other. For example, the 1-1st magnets 1141*a* and 1143*a* may be magnetized to have N poles and S poles along the optical axis direction (the Z-axis direction), and the 1-2 magnets 1145*a* and 1147*a* may be magnetized to have N poles and S poles along the Y-axis direction perpendicular to the optical axis (the Z axis).

When power is applied to the plurality of coils 1141*b*, 1143*b*, 1145*b*, and 1147*b*, the rotation holder 1120 on which the plurality of magnets 1141*a*, 1143*a*, 1145*a*, and 1147*a* are mounted may rotate with respect to the first axis (the X axis) and the second axis (the Y axis) by an electromagnetic force between the plurality of magnets 1141*a*, 1143*a*, 1145*a*, and 1147*a* and the plurality of coils 1141*b*, 1143*b*, 1145*b*, and 1147*b*.

The plurality of coils 1141*b*, 1143*b*, 1145*b*, and 1147*b* may be mounted on the housing 1010. As an example, the plurality of coils 1141*b*, 1143*b*, 1145*b*, and 1147*b* may be mounted on the housing 1010 in a state in which the plurality of coils 1141*b*, 1143*b*, 1145*b*, and 1147*b* are mounted on the main board 1070.

That is, the plurality of coils 1141*b*, 1143*b*, 1145*b*, and 1147*b* may be provided on the main board 1070, the main board 1070 may be attached onto an outer surface of the housing 1010, and the plurality of coils 1141*b*, 1143*b*, 1145*b*, and 1147*b* may be exposed to the inside of the housing 1010 through through-holes 1010-1 and 1010-2 to face the plurality of magnets 1141*a*, 1143*a*, 1145*a*, and 1147*a*.

Here, although it is illustrated in the drawings that the main board 1070 is integrally provided as a whole so that both the coils for the reflection module 1100 and the coils for the lens module 1200 are mounted thereon, the main board 1070 may be provided as two or more separate boards on which the coils for the reflection module 1100 and the coils for the lens module 1200 are mounted, respectively.

A closed loop control method may be used. In the closed loop control method, a position of the rotation holder 1120 may be detected when the rotation holder 1120 rotates, and feedback on the detected position may be given.

For the closed loop control, position detection sensors 1141*c*, 1143*c*, 1145*c*, and 1147*c* may be required. Each of the position detection sensors 1141*c*, 1143*c*, 1145*c*, and 1147*c* may be a Hall sensor, a TMR sensor, a magnetic sensor, or the like.

The position detection sensors 1141*c*, 1143*c*, 1145*c*, and 1147*c* may be disposed inside or outside the coils 1141*b*, 1143*b*, 1145*b*, and 1147*b*, respectively, and may be mounted on the main board 1070 together with the coils 1141*b*, 1143*b*, 1145*b*, and 1147*b*, respectively.

The position detection sensors 1141*c*, 1143*c*, 1145*c*, and 1147*c* may interact with either or both the 1-1st magnets 1141*a* and 1143*a* and the 1-2nd magnets 1145*a* and 1147*a*, which are driving magnets, or may interact with a sensing magnet 1149*a* provided separately.

The main board 1070 may be provided with a gyro sensor (not illustrated) sensing a shake factor such as a user's handshake or the like, and may be provided with a driver integrated circuit (IC) (not illustrated) providing driving signals to the plurality of coils 1141*b*, 1143*b*, 1145*b*, and 1147*b*.

When the rotation holder 1120 rotates with respect to the first axis (the X axis), the rotation plate 1130 may rotate while being supported by the first ball members 1131 arranged along the first axis (the X axis) (in this case, the rotation holder 1120 does not move relative to the rotation plate 1130).

When the rotation holder 1120 rotates with respect to the second axis (the Y axis), the rotation holder 1120 may rotate by moving on the second ball members 1133 arranged along the second axis (Y axis) (in this case, since the rotation plate 1130 does not rotate, the rotation holder 1120 may move relative to the rotation plate 1130).

That is, when rotating with respect to the first axis (the X axis), the rotation plate 1130 may rotate together with the rotation holder 1120, and when rotating with respect to the second axis (the Y axis), the rotation holder 1120 may rotate.

When rotating with respect to the first axis (the X axis), the first ball members 1131 may form an axis of rotation, and when rotating with respect to the second axis (the Y axis), the second ball members 1133 may form an axis of rotation.

This is because, as illustrated in the drawings, the second ball members 1133 aligned with the second axis (the Y axis) may not move in a state in which they are inserted into the guide grooves when the rotation holder 1120 rotates with respect to the first axis (the X axis), and the first ball members 1131 aligned with the first axis (the X axis) may not move in a state in which they are inserted into the guide grooves when the rotation holder 1120 rotates with respect to the second axis (the Y axis).

The reflection module 1100 has been described herein on the assumption that the rotation holder 1120 provided with the optical path changing member 1110 rotates in a supported state via the ball members 1131 or 1133 aligned in one direction on one surface of the housing 1010 or the like, but the configuration of the rotation holder 1120 is not limited thereto.

For example, the rotation holder 1120 may be 1) rotatable while being suspended from the housing via a spring, 2) rotatably fixed to the housing via a hinge-type rotation member, 3) provided on the housing in a pivot type to be rotatable with respect to one axis, or 4) rotatable while being supported by the housing via ball members moving by sliding or rotating along a curved ball guide.

Figure 9:
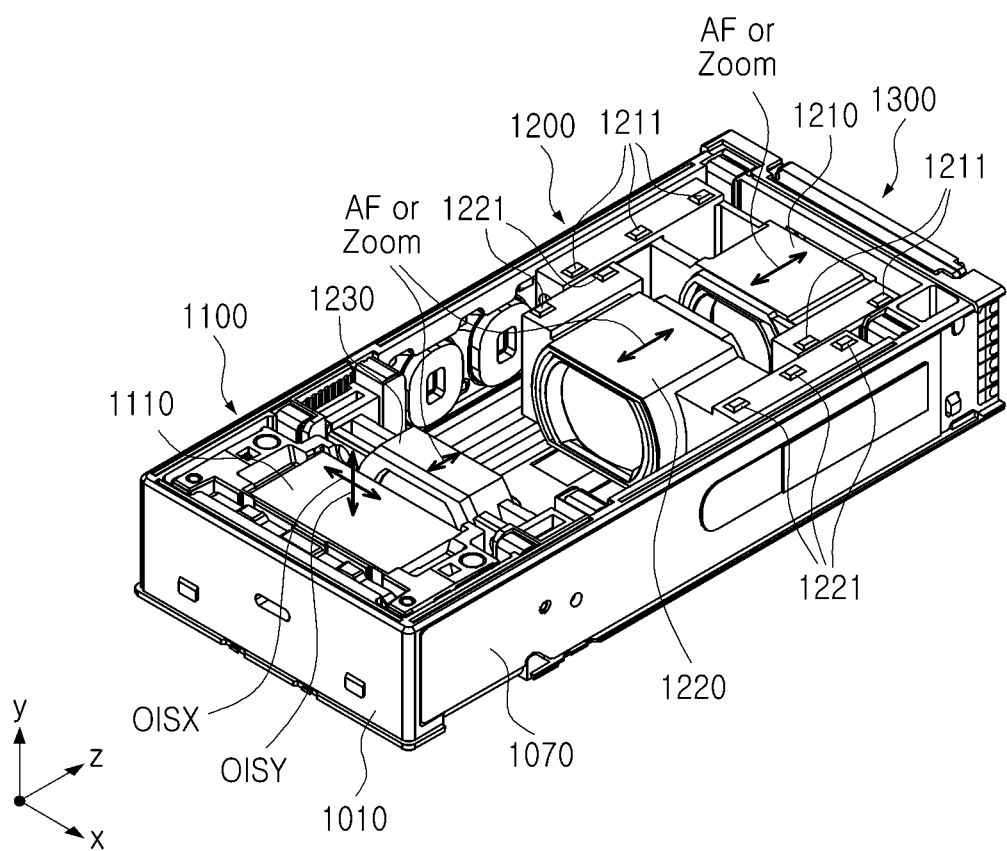
FIG. 9 is a perspective view in which a reflection module and a lens module are coupled to the housing of the camera module according to an example.
Figure 10:
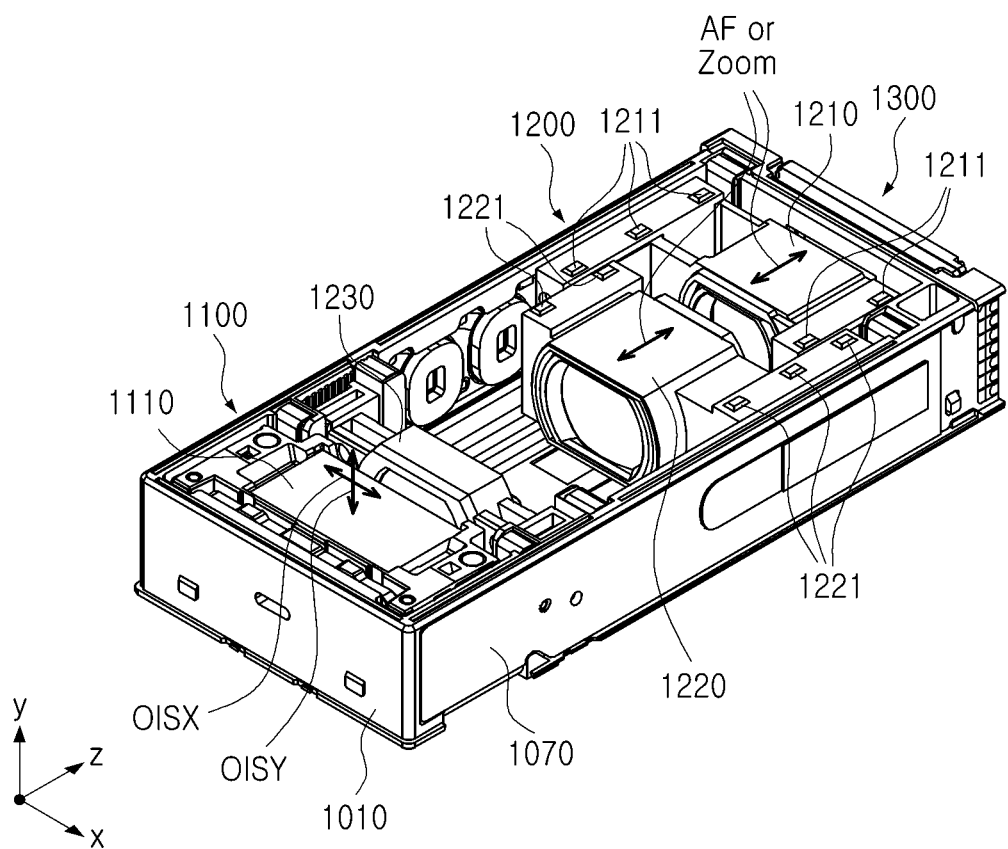
FIG. 10 is a perspective view in which a reflection module and a lens module are coupled to a housing of the camera module according to another example.
Figure 11:
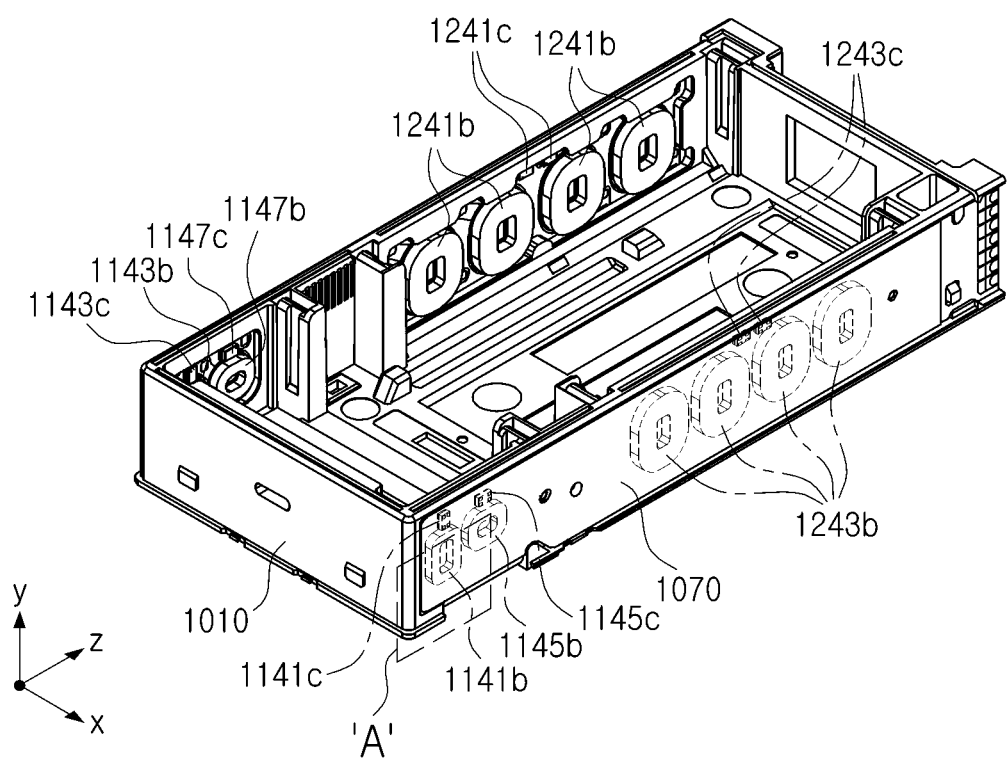
FIG. 11 is a perspective view in which a main board on which driving coils and position detection sensors are mounted is coupled to the housing of the camera module according to an example.
Figure 12:
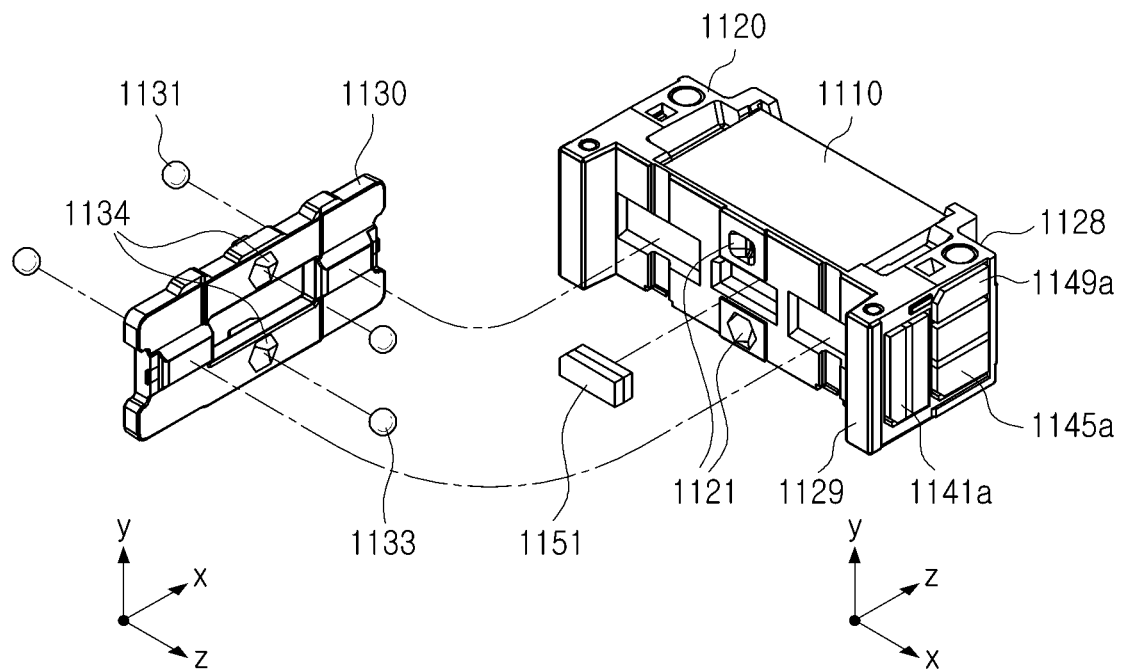
FIG. 12 illustrates exploded perspective views of a rotation plate and a rotation holder of the camera module according to an example.

FIG. 9 is a perspective view in which the reflection module and the lens module are coupled to the housing of the camera module according to an example, and FIG. 10 is a perspective view in which the reflection module and the lens module are coupled to the housing of the camera module according to another example.

Referring to FIGS. 9 and 10, it is disclosed how the AF, Zoom, and OIS functions are implemented in the camera module 1000.

Light of which a path is changed by the reflection module 1100 may be incident to the lens module 1200. Then, the incident light may move to the three lens modules 1210, 1220, and 1230 in the optical axis direction (the Z-axis direction) to implement an AF or zoom function.

Referring to FIG. 9, for example, the two rear lens modules 1210 and 1220 may take charge of the zoom function, and the one front lens module 1230 may take charge of the autofocus function.

Alternatively, referring to FIG. 10, the two rear lens modules 1210 and 1220 may take charge of both the zoom function and the autofocus function, and the one front lens module 1230 may be disposed as a fixing member. For example, the two rear lens modules 1210 and 1220 may be combined together to take charge of the zoom function, and the rearmost lens module 1210 may additionally take charge of the autofocus function.

The configurations of the three lens modules 1210, 1220, and 1230 are not limited thereto, and may be combined in various manners to take care of the zoom function and the autofocus function separately or together.

A space in which the front one lens module 1230 and the two rear lens modules 1210 and 1220 are provided may be partitioned by second protruding walls 1008. However, the configurations of the three lens modules 1210, 1220, and 1230 are not limited thereto, and may all be provided in the same space or may be provided in different partitioned spaces.

Referring additionally to FIGS. 16 through 20, the lens module 1200 s capable of implementing the AF function and the zoom function, and the first and second lens modules 1210 and 1220 are driven by the second driving unit 1240.

The lens module 1200 may include two lens modules provided to be movable in the optical axis direction (the Z-axis direction) in the internal space of the housing 1010: a first lens module 1210 and a second lens module 1220. Then, the two lens modules 1210 and 1220 may be moved by the second driving unit 1240 in the optical axis direction (the Z-axis direction) with respect to the housing 1010.

The first and second lens modules 1210 and 1220 may be configured to move approximately in the optical axis direction (the Z-axis direction) to implement an AF function or a zoom function.

Thus, the second driving unit 1240 may generate a driving force so that each of the first and second lens modules 1210 and 1220 is movable in the optical axis direction (the Z-axis direction). That is, the second driving unit 1240 may individually move each of the first and second lens modules 1210 and 1220 in the optical axis direction (the Z-axis direction) to implement an AF function or a zoom function.

The first and second lens modules 1210 and 1220 may be provided on the bottom surface of the housing 1010 in a supported manner. For example, both the first and second lens modules 1210 and 1220 may be individually supported by the bottom surface of the housing 1010 via ball members or shafts.

The first lens module 1210 is provided in the housing 1010 to be movable in the optical axis direction (the Z-axis direction). As an example, one first shaft 1215a and one third ball member 1215b may be provided between the first lens module 1210 and the bottom surface of the housing 1010.

The first lens module 1210 may move in the optical axis direction (the Z-axis direction) on a first shaft 1215a and a third ball member 1215b, the first shaft 1215a being fixedly disposed to be elongate in the optical axis direction (the Z-axis direction) on one side of the bottom surface of the housing 1010, and the third ball member 1215b being disposed to be movable by rolling in the optical axis direction (the Z-axis direction) on the other side of the bottom surface of the housing 1010.

The first lens module 1210 may be provided to be movable by sliding on the first shaft 1215a, and to be movable by rolling on the third ball member 1215b.

The first shaft 1215a and the third ball member 1215b may be disposed in fifth guide grooves 1013a and 1013b provided to be elongate in the optical axis direction (the Z-axis direction) on both sides of the bottom surface of the housing 1010, respectively.

The first shaft 1215a may be pressed and supported by stoppers 1060-1061, which will be described below, to be fixed into the 5-1st guide groove 1013a, or may be fixed by bonding using a separate adhesive. In addition, the third ball member 1215b may move by rolling in the 5-2nd guide groove 1013b.

The first shaft 1215a and the third ball member 1215b may be accommodated in the fifth guide grooves 1013a and 1013b and disposed between the first lens module 1210 and the housing 1010.

The fifth guide grooves 1013a and 1013b may be formed to be elongate in the optical axis direction (the Z-axis direction). Each of the fifth guide grooves 1013a and 1013b may have a cross section in various shapes, such as a round shape, a V shape, and a polygonal shape.

Sixth guide grooves 1214a and 1214b into which the first shaft 1215a and the third ball member 1215b are inserted may be provided in a lower surface of the first lens module 1210 facing the bottom surface of the housing 1010. Each of the sixth guide grooves 1214a and 1214b may have a cross section in various shapes, such as a round shape, a V shape, and a polygonal shape.

As will be described below, first bearing members 1218 supporting the first shaft 1215a may be disposed at two spots spaced apart from each other in the optical axis direction (the Z-axis direction) in the 6-1st guide groove 1214a.

The two first bearing members 1218 may be coupled to the 6-1st guide groove 1214a in a bonding type using an adhesive, or may be manufactured integrally with the first lens module 1210 in an insert injection type by inserting the two first bearing members 1218 into a mold at the time of manufacturing the first lens module 1210.

Sliding friction may occur between the first shaft 1215a and the first bearing members 1218.

The two first bearing members 1218 may be disposed to be spaced apart from each other in the optical axis direction (the Z-axis direction) in the 6-1st guide groove 1214a to contact the first shaft 1215a on both sides.

The first shaft 1215a may contact the two first bearing members 1218 only without contacting the 6-1st guide groove 1214a, thereby reducing a frictional force caused when the first lens module 1210 moves by sliding.

Figure 23:
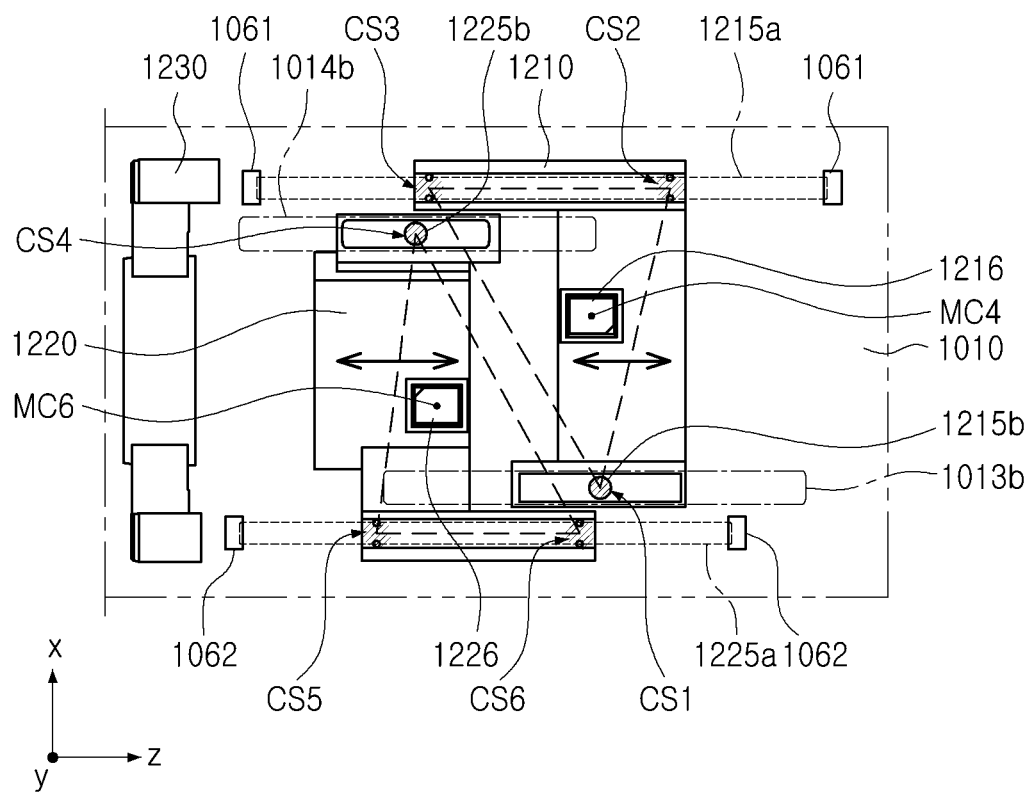
FIG. 23 is a reference view illustrating a state in which lens modules are installed in the housing according to an example.

Accordingly, the first lens module 1210 may form a schematic three-spot support structure by a first contact spot CS1 where the first lens module 1210 contacts one third ball member 1215b, and a second contact spot CS2 and a third contact spot CS3 where two first bearing members 1218 spaced apart from each other in the optical axis direction (the Z-axis direction) contact the first shaft 1215a (see FIG. 23).

The first lens module 1210 may be pressed toward the bottom of the housing 1010 to keep the contacts between the housing 1010 and the third ball member 1215b and between the housing 1010 and the first shaft 1215a.

To this end, a third magnetic material 1016 and a fourth magnetic material 1216 may be optionally provided on the bottom surface of the housing 1010 and the lower surface of the first lens module 1210 facing the bottom surface of the housing 1010, respectively, and the first lens module 1210 may be pressed toward the bottom surface of the housing 1010 by a magnetic force therebetween. The magnetic force may be generated between the third magnetic material 1016 and the fourth magnetic material 1216 in a direction perpendicular to the optical axis (e.g., the Y-axis direction).

The third magnetic material 1016 and the fourth magnetic material 1216 may be a pulling yoke and a pulling magnet. For example, the third magnetic material 1016 and the fourth magnetic material 1216 may selectively be a pulling yoke and a pulling magnet, or both the third magnetic material 1016 and the fourth magnetic material 1216 may be pulling magnets.

The third magnetic material 1016 may be provided on the bottom surface of the housing 1010 to be elongate in the optical axis direction (the Z-axis direction) along a movement path of the first lens module 1210, and the fourth magnetic material 1216 may be provided on the lower surface of the first lens module 1210 to face the third magnetic material 1016. The third magnetic material 1016 may be provided to be elongate enough in the optical axis direction (the Z-axis direction) to continuously face the fourth magnetic material 1216 in consideration of the movement path of the first lens module 1210.

The third magnetic material 1016 may be attached to the outer surface of the housing 1010, and exposed to the internal space of the housing 1010 through a magnetic material hole 1016a provided in the bottom of the housing 1010. Alternatively, the third magnetic material 1016 may be attached to an inner bottom surface of the housing 1010 or inserted into the bottom surface of the housing 1010.

The first lens module 1210 may form a stable three-spot support structure at any position after moving in the optical axis direction (the Z-axis direction).

Figure 24:
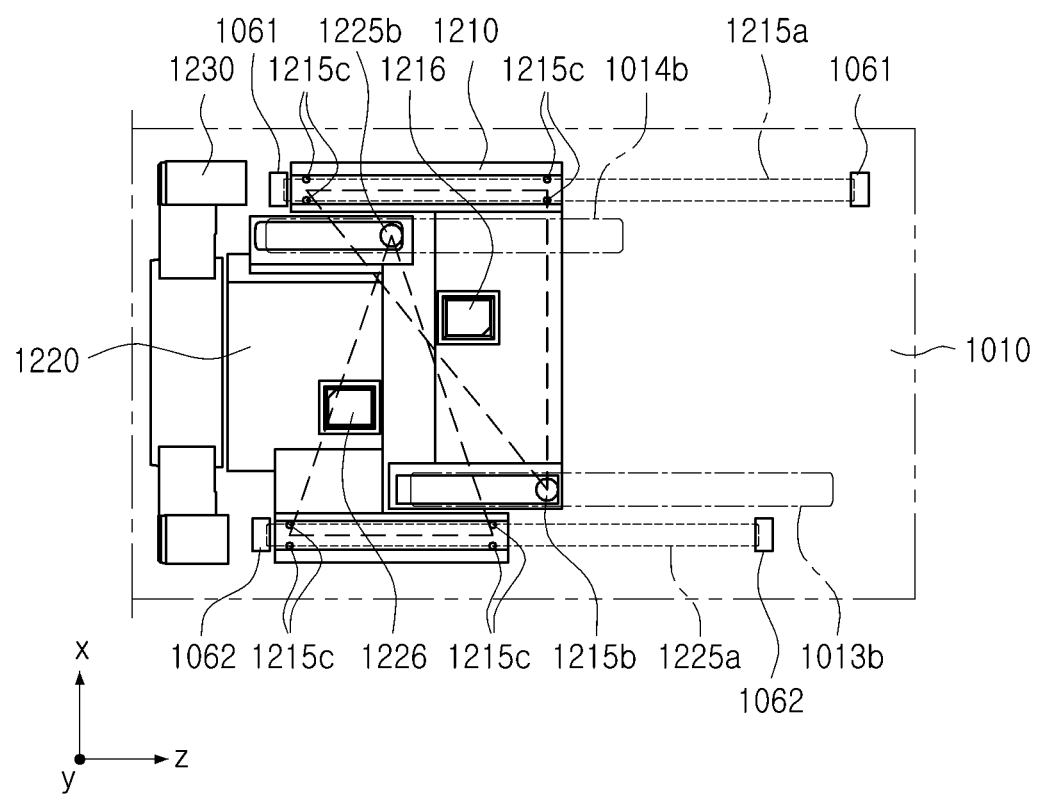
FIG. 24 is a reference view illustrating a state in which all lens modules move toward a reflection module in the housing according to an example.
Figure 25:
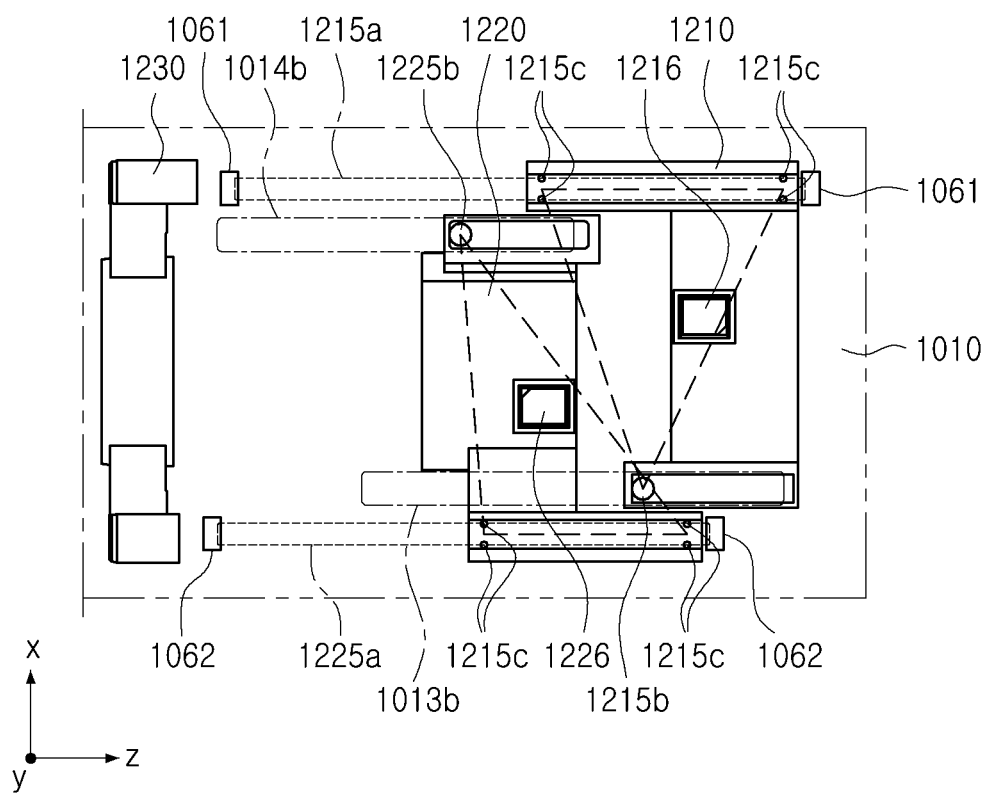
FIG. 25 is a reference view illustrating a state in which all lens modules move toward an image sensor module according to an example.

That is, as seen from FIGS. 23 through 25, the first lens module 1210 may move in the optical axis direction (the Z-axis direction) (approximately the middle position in FIG. 23, the leftmost position in FIG. 24, and the rightmost position in FIG. 25).

In addition, the center MC4 of action of the magnetic force caused by the fourth magnetic material 1216 may be positioned inside a triangle formed by the first contact spot CS1 where the first lens module 1210 contacts the third ball member 1215b, and the second contact spot CS2 and the third contact spot CS3 which are two spots where the first lens module 1210 contacts the first shaft 1215a.

The center of action of the magnetic force caused by the fourth magnetic material 1216 may be, for example, the geometric center of a surface of the fourth magnetic material 1216 facing the third magnetic material 1016. As seen from FIG. 23, the geometric center of the fourth magnetic material 1216 may refer to an approximate center of gravity on an X-Z plane of the fourth magnetic material 1216.

The coils 1241b for driving the first lens module 1210 may be provided on one of opposite side surfaces of the housing 1010. In this case, an electromagnetic force acts on one side surface of the first lens module 1210. Thus, in order to easily drive the first lens module 1210, the third magnetic material 1016 and the fourth magnetic material 1216 may be provided to be biased toward one side surface of the housing 1010, that is, a side where the coils 1241b are positioned, rather than the center of the housing 1010.

In order to increase a size of each of the magnets 1241a to improve a driving force, the first lens module 1210 may have a first support portion 1219 by extending a portion where the magnets 1241a are mounted in the optical axis direction (the Z-axis direction) toward the second lens module 1220.

Furthermore, in order to increase a size of each of the magnets 1243a to improve a driving force, the second lens module 1220 may also have a second support portion 1229 by extending a portion where the magnets 1243a are mounted in the optical axis direction (the Z-axis direction) toward the first lens module 1210.

The first support portion 1219 and the second support portion 1229 may extend in opposite directions.

The second lens module 1220 may be disposed in the housing 1010 to be movable in the optical axis direction (the Z-axis direction). As an example, the second lens module 1220 may be disposed in front of the first lens module 1210 in the optical axis direction (the Z-axis direction).

One second shaft 1225a and one fourth ball member 1225b may be provided between the second lens module 1220 and the bottom surface of the housing 1010.

The second lens module 1220 may move in the optical axis direction (the Z-axis direction) while being supported by the second shaft 1225a and the fourth ball member 1225b, the second shaft 1225a being fixedly disposed to be elongate in the optical axis direction (the Z-axis direction) on the other side of the bottom surface of the housing 1010, and the fourth ball member 1225b being disposed to be movable by rolling in the optical axis direction (the Z-axis direction) on one side of the bottom surface of the housing 1010.

That is, the second lens module 1220 may be provided to be movable by sliding on the second shaft 1225a, and to be movable by rolling on the fourth ball member 1225b.

The second shaft 1225a and the fourth ball member 1225b may be disposed in seventh guide grooves 1014a and 1014b provided to be elongate in the optical axis direction (the Z-axis direction) on both sides of the bottom surface of the housing 1010, respectively.

The second shaft 1225a may be pressed and supported by stoppers 1060-1062, which will be described below, to be fixed into the 7-1st guide groove 1014a, or may be fixed by bonding using a separate adhesive. The fourth ball member 1225b may move by rolling in the 7-2nd guide groove 1014b.

The second shaft 1225a and the fourth ball member 1225b may be accommodated in the seventh guide grooves 1014a and 1014b and disposed between the second lens module 1220 and the housing 1010.

The seventh guide grooves 1014a and 1014b may be formed to be elongate in the optical axis direction (the Z-axis direction). Each of the seventh guide grooves 1014a and 1014b may have a cross section in various shapes, such as a round shape, a V shape, and a polygonal shape.

Eighth guide grooves 1224a and 1224b into which the second shaft 1225a and the fourth ball member 1225b are inserted may be provided on a lower surface of the second lens module 1220 facing the bottom of the housing 1010. Each of the eighth guide grooves 1224a and 1224b may have a cross section in various shapes, such as a round shape, a V shape, and a polygonal shape.

Second bearing members 1228 supporting the second shaft 1225a may be disposed at two spots spaced apart from each other in the optical axis direction (the Z-axis direction) in the 8-1st guide groove 1224a.

The two second bearing members 1228 may be coupled to the 8-1st guide groove 1224a in a bonding type using an adhesive, or may be manufactured integrally with the second lens module 1220 in an insert injection type by inserting the two second bearing members 1228 into a mold at the time of manufacturing the second lens module 1220.

Sliding friction may occur between the second shaft 1225*a* and the second bearing members 1228.

The two second bearing members 1228 may be disposed to be spaced apart from each other in the optical axis direction (the Z-axis direction) in the 8-1st guide groove 1224*a* to contact the second shaft 1225*a* on both sides.

The second shaft 1225*a* may contact the two second bearing members 1228 only without contacting the 8-1st guide groove 1224*a*, thereby reducing a frictional force caused when the second lens module 1220 moves by sliding.

Accordingly, the second lens module 1220 may form a schematic three-spot support structure by a fourth contact spot CS4 where the second lens module 1220 contacts one fourth ball member 1225*b*, and a fifth contact spot CS5 and a sixth contact spot CS6 where two second bearing members 1228 spaced apart from each other in the optical axis direction (the Z-axis direction) contact the second shaft 1225*a*.

The second lens module 1220 may be pressed toward the bottom of the housing 1010 to keep the contacts between the housing 1010 and the fourth ball member 1225*b* and between the housing 1010 and the second shaft 1225*a*.

To this end, a fifth magnetic material 1017 and a sixth magnetic material 1226 may be optionally provided on the bottom surface of the housing 1010 and the lower surface of the second lens module 1220 facing the bottom surface of the housing 1010, respectively, and the second lens module 1220 may be pressed toward the bottom surface of the housing 1010 by a magnetic force therebetween. The magnetic force may be generated between the fifth magnetic material 1017 and the sixth magnetic material 1226 in a direction perpendicular to the optical axis (e.g., the Y-axis direction).

The fifth magnetic material 1017 and the sixth magnetic material 1226 may be a pulling yoke and a pulling magnet. For example, the fifth magnetic material 1017 and the sixth magnetic material 1226 may selectively be a pulling yoke and a pulling magnet, or both the fifth magnetic material 1017 and the sixth magnetic material 1226 may be pulling magnets.

The fifth magnetic material 1017 may be provided on the bottom surface of the housing 1010 to be elongate in the optical axis direction (the Z-axis direction) along a movement path of the second lens module 1220, and the sixth magnetic material 1226 may be provided on the lower surface of the second lens module 1220 to face the fifth magnetic material 1017. The fifth magnetic material 1017 may be disposed to be elongate enough in the optical axis direction (the Z-axis direction) to continuously face the sixth magnetic material 1226 in consideration of the movement path of the second lens module 1220.

The fifth magnetic material 1017 may be attached to the outer surface of the housing 1010, and exposed to the internal space of the housing 1010 through a magnetic material hole 1017*a* provided in the bottom of the housing 1010. Alternatively, the fifth magnetic material 1017 may be attached to an inner bottom surface of the housing 1010 or inserted into the bottom surface of the housing 1010.

The third magnetic material 1016 and the fifth magnetic material 1017 provided to be elongate in the optical axis direction (the Z-axis direction) along the movement path of the first lens module 1210 on the bottom surface of the housing 1010 may be provided separately or provided integrally (in the drawings, it is only illustrated for convenience that the third magnetic material 1016 and the fifth magnetic material 1017 are provided integrally).

Furthermore, the second lens module 1220 may form a stable three-spot support structure at any position after moving in the optical axis direction (the Z-axis direction).

That is, as seen from FIGS. 23 through 25, the second lens module 1220 may move in the optical axis direction (the Z-axis direction) (approximately the middle position in FIG. 23, the leftmost position in FIG. 24, and the rightmost position in FIG. 25).

The center MC6 of action of the magnetic force caused by the sixth magnetic material 1226 may be positioned inside a triangle formed by the fourth contact spot CS4 where the second lens module 1220 contacts the fourth ball member 1225*b*, and the fifth contact spot CS5 and the sixth contact spot CS6 which are two spots where the second lens module 1220 contacts the second shaft 1225*a*.

The center of action of the magnetic force caused by the sixth magnetic material 1226 may be, for example, the geometric center of a surface of the sixth magnetic material 1226 facing the fifth magnetic material 1017. As seen from FIG. 23, the geometric center of the sixth magnetic material 1226 may refer to an approximate center of gravity on an X-Z plane of the sixth magnetic material 1226.

The coils 1243*b* for driving the second lens module 1220 may be provided on one of opposite side surfaces of the housing 1010. In this case, an electromagnetic force acts on one side surface of the second lens module 1220. Thus, in order to easily drive the second lens module 1220, the fifth magnetic material 1017 and the sixth magnetic material 1226 may be provided to be biased toward one side surface of the housing 1010, that is, a side where the coils 1243*b* are positioned, rather than the center of the housing 1010.

As described above, the first lens module 1210 and the second lens module 1220 may move in the optical axis direction (the Z-axis direction) on different ball members and shafts. This is to enable each of the first lens module 1210 and the second lens module 1220 to move a long distance in the optical axis direction (the Z-axis direction) in order to implement a long stroke, and provide a long support portion in order to stably drive each of the lens modules.

Figure 17:
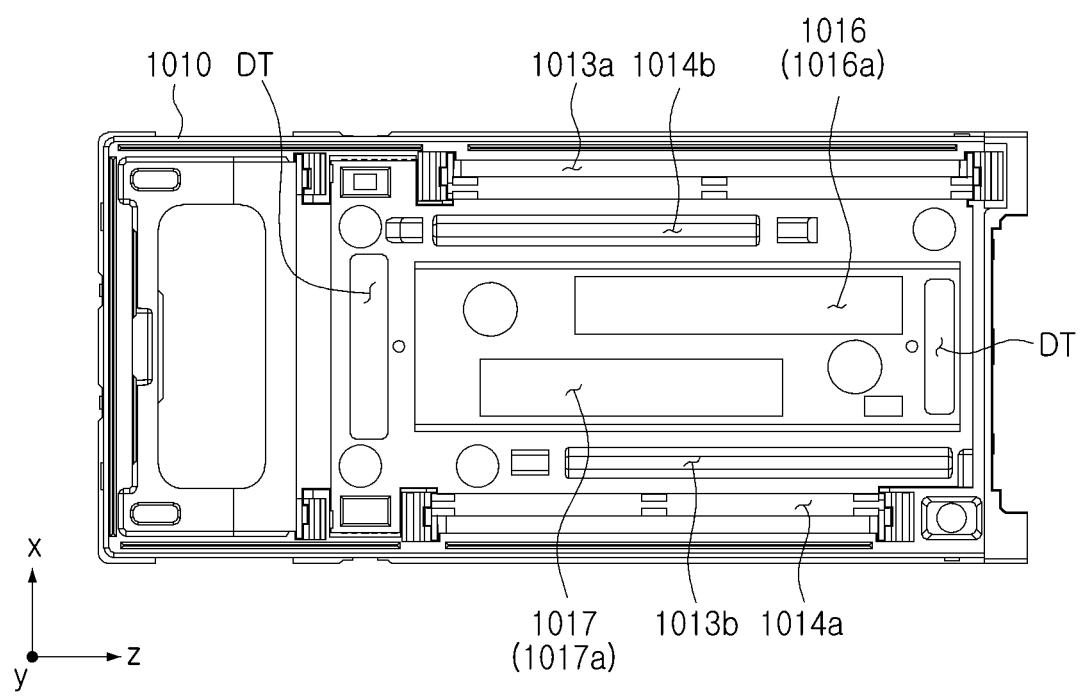
FIG. 17 is a plan view of the housing according to an example.

As illustrated in FIG. 17, the 5-1st guide groove 1013*a* and the 5-2nd guide groove 1013*b* for the first lens module 1210 and the 6-1st guide groove 1014*a* and the 6-2nd guide groove 1014*b* for the second lens module 1220 may be disposed in parallel to each other in the bottom surface of the housing 1010, and the first shaft 1215*a* and the second shaft 1225*a* may be disposed in the 5-1st guide groove 1013*a* and the 6-1st guide groove 1014*a*, respectively.

In the camera module 1000, each of the first lens module 1210 and the second lens module 1220 may move a long distance in the optical axis direction (the Z-axis direction) to implement the zoom function. Thus, the first shaft 1215*a*, the 5-2nd guide groove 1013*b*, the second shaft 1225*a*, and the 6-2nd guide groove 1014*b* may be disposed to considerably overlap each other in the direction perpendicular to the optical axis (the Z axis).

The housing 1010 may include a groove-shaped dust trap DT provided on the inner surface thereof to collect foreign substances that may be generated therein or may flow thereinto from the outside, and the dust trap DT may be filled with a sticky adhesive material to easily collect the foreign substances.

The first driving unit 1140 and the second driving unit 1240 for driving the reflection module 1100 and the lens module 1200, respectively, may be provided in the housing 1010. The first driving unit 1140 has been described above in detail, and the second driving unit 1240 may include a plurality of coils 1241b and 1243b for driving a plurality of lens modules 1200, including a first lens module 1210 and a second lens module 1220.

As an example, the second driving unit 1240 may include a plurality of magnets 1241a and 1243a, and a plurality of coils 1241b and 1243b disposed to face the plurality of magnets 1241a and 1243a.

The first and second lens modules 1210 and 1220 need to move a long distance in the optical axis direction (the Z-axis direction) to implement a zoom camera. Thus, the magnets 1241a and the magnets 1243a may be magnetized in two or more poles to sequentially have at least an N pole and an S pole in the optical axis direction (the Z-axis direction), and the coils 1241b and 1243b may include at least two coils 1241b and at least two coils 1243b.

When power is applied to the plurality of coils 1241b and 1243b, each of the first and second lens modules 1210 and 1220 on which the plurality of magnets 1241a and 1243a are separately mounted, respectively, may be individually moved in the optical axis direction (the Z-axis direction) by an electromagnetic force between the plurality of magnets 1241a and 1243a and the plurality of coils 1241b and 1243b. Thereby, zoom or autofocus control may be implemented.

The plurality of magnets 1241a and 1243a may be separately mounted on the first and second lens modules 1210 and 1220, respectively. As an example, the first magnets 1241a may be mounted on a side surface of the first lens module 1210, and the second magnets 1243a may be mounted on a side surface of the second lens module 1220.

The plurality of coils 1241b and 1243b may be mounted on the housing 1010 to face the plurality of magnets 1241a and 1243a, respectively.

Since the plurality of magnets 1241a and 1243a provided on the first and second lens modules 1210 and 1220 may be separately disposed on opposite side surfaces of the first and second lens modules 1210 and 1220, respectively, the plurality of coils 1241b and 1243b may also be separately provided on opposite side walls of the housing 1010 to face the plurality of magnets 1241a and 1243a, respectively.

As an example, the plurality of coils 1241b and 1243b may be mounted on the main board 1070, and the main board 1070 may be attached onto the outer surface of the housing 1010 so that the plurality of coils 1241b and 1243b are exposed to the inside of the housing 1010 through through-holes 1010-3 and 1010-4.

A closed loop control method may be used. In the closed loop control method, positions of the first and second lens modules 1210 and 1220 may be detected when the first and second lens modules 1210 and 1220 move, and feedback on the detected positions may be given. For the closed loop control, position detection sensors 1241c and 1243c may be required. Each of the position detection sensors 1241c and 1243c may be a Hall sensor, a TMR angle sensor, a general TMR sensor, or the like.

The position detection sensors 1241c and 1243c may be disposed inside or outside the coils 1241b and 1243b, respectively, and may be mounted on the main board 1070 together with the coils 1241b and 1243b, respectively. Taking into account that each of the first and second lens modules 1210 and 1220 moves a very long distance, a plurality of position detection sensors 1241c and a plurality of position detection sensors 1243c may be provided to be spaced apart from each other in the optical axis direction (the Z-axis direction).

Figure 18A:
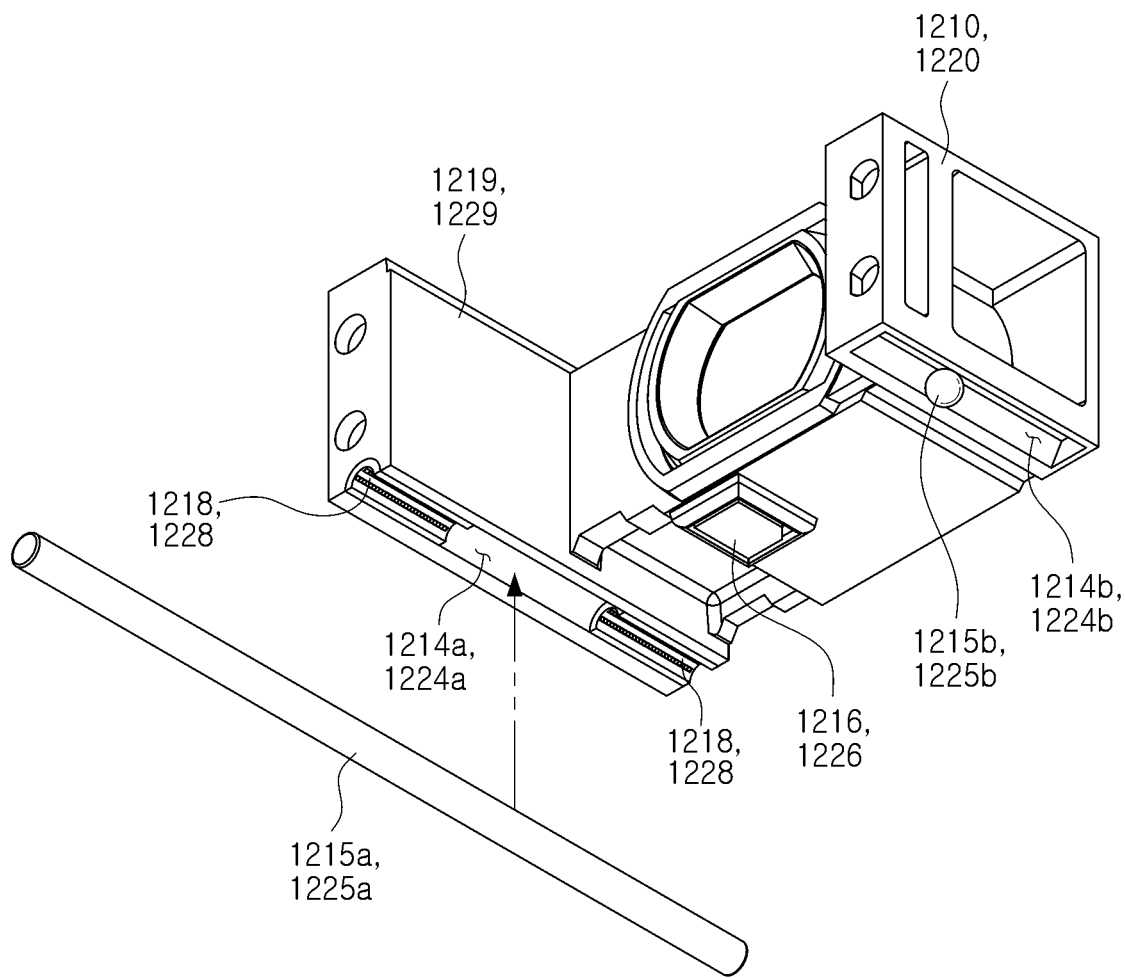
FIGS. 18A and 18B are perspective views of various examples each illustrating a structure in which the lens module or a lens barrel coupled to a holder is supported by the housing according to an example.
Figure 18B:
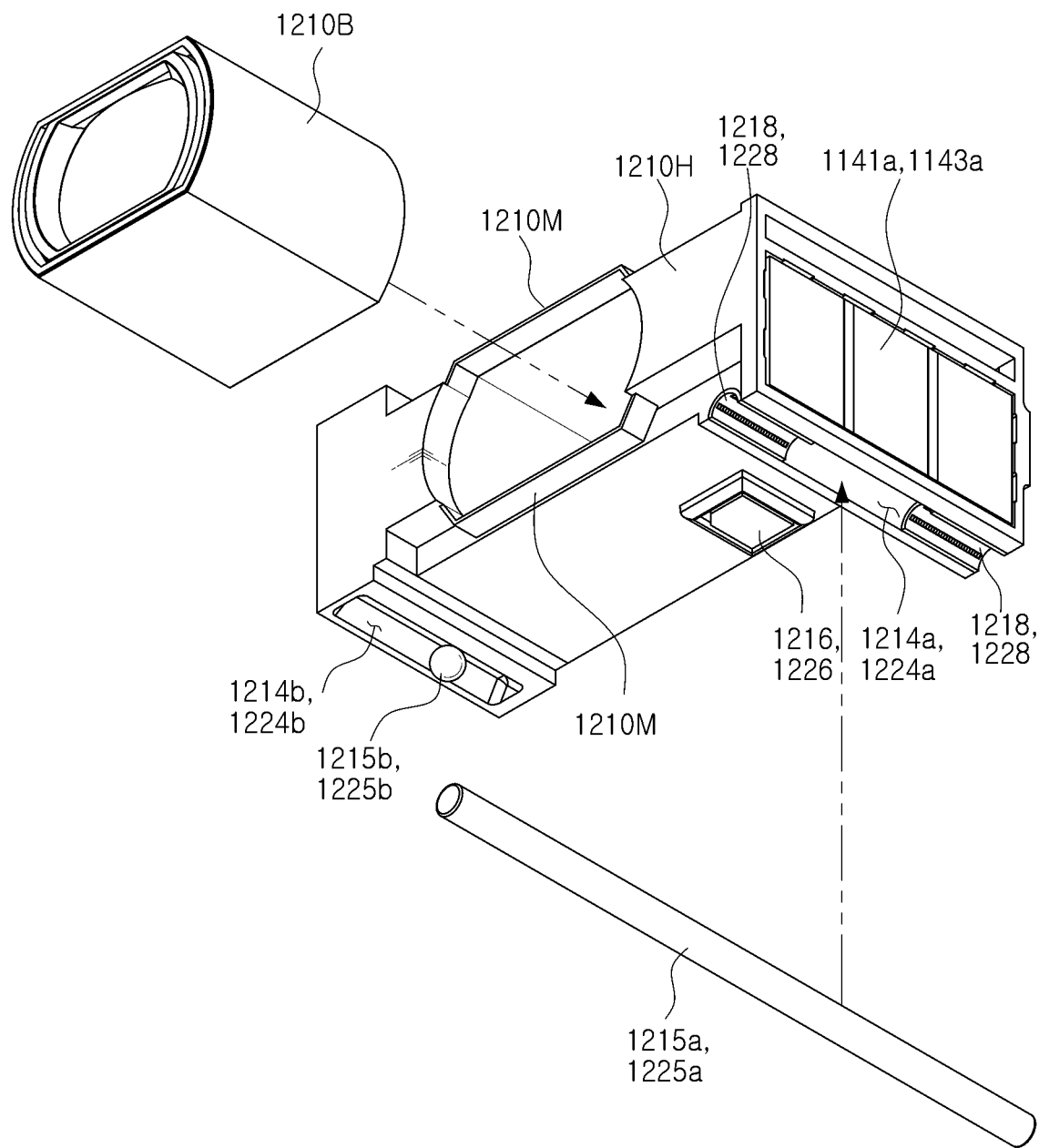
Figure 19:
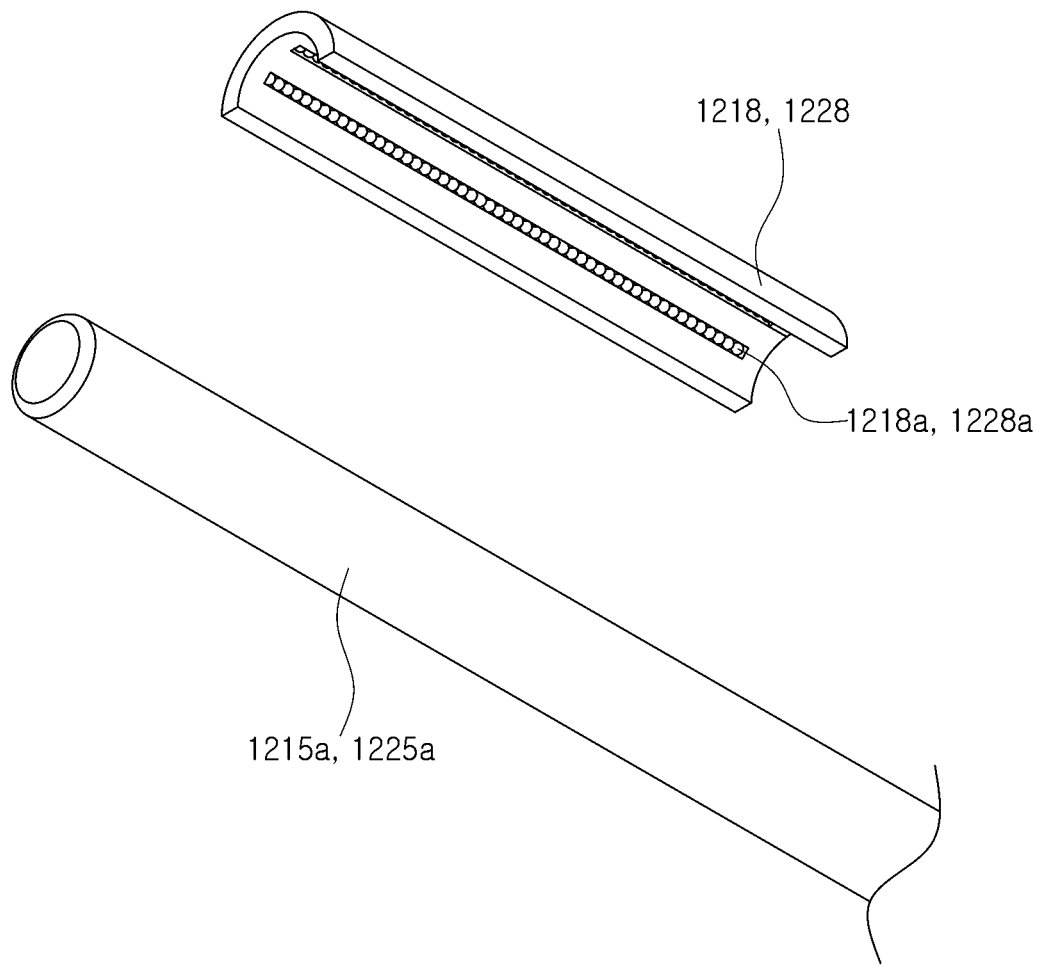
FIG. 19 illustrates perspective views of a shaft and a bearing member according to an example.

FIGS. 18A and 18B are perspective views of various examples each illustrating a structure in which the lens module or a lens barrel coupled to a holder is supported by the housing according to an example, and FIG. 19 illustrates perspective views of the shaft and the bearing member according to an example.

Referring to FIG. 18A, the first or second lens modules 1210 or 1220 may be guided by the first or second shaft 1215a or 1225a and the third or fourth ball member 1215b or 1225b to move inside the housing 1010 in the optical axis direction (the Z-axis direction). The first or second bearing members 1218 or 1228 contacting the first or second shaft 1215a or 1225a may be disposed on the first or second lens module 1210 or 1220.

For convenience of explanation, only the first lens module 1210, the first shaft 1215a, the third ball member 1215b, and the first bearing members 1218 will be described below.

The first shaft 1215a may be a member fixed to the housing 1010, and the third ball member 1215b may be provided to be movable in a rolling manner.

Accordingly, when the first lens module 1210 moves in the optical axis direction (the Z-axis direction), one side of the first lens module 1210 may move on the shaft 1215a, thereby generating sliding friction, and the other side of the first lens module 1210 may move on the third ball member 1215b, thereby generating rolling friction.

Since one side of the first lens module 1210 moves by sliding on the first shaft 1215a, the camera module may further include first bearing members 1218 to reduce friction and noise.

In an example, each of the first bearing members 1218 may be a linear bearing. For example, the first bearing member 1218 may have a cylindrical or hemispherical sleeve shape, and a plurality of ball bearings 1218a may be disposed on an inner circumferential surface of the sleeve. The plurality of ball bearings 1218a may be arranged along the optical axis (the Z axis). Likewise, the second bearing member 1228 may have a cylindrical or hemispherical sleeve shape, and a plurality of ball bearings 1228a may be disposed on an inner circumferential surface of the sleeve. The plurality of ball bearings 1228a may be arranged along the optical axis (the Z axis).

The first shaft 1215a may be disposed in contact with the first bearing members 1218. For example, two first bearing members 1218 may be disposed to be spaced apart from each other in the optical axis direction (the Z-axis direction) on the lower surface of the first lens module 1210, and each of the two first bearing members 1218 may contact the first shaft 1215a.

The 6-1st guide groove 1214a into which the first shaft 1215a is inserted may be provided in the first lens module 1210, and the two first bearing members 1218 may be disposed in the 6-1st guide groove 1214a to be fixed to the first lens module 1210.

Alternatively, the first bearing members 1218 may be integrally coupled to the first lens module 1210 by insert injection. In this case, by injecting a resin material into a mold in a state in which the first bearing members 1218 are fixed in the mold, the first bearing members 1218 may be manufactured to be integrated with the first lens module 1210.

Therefore, the first bearing members 1218 make it possible to reduce friction between the first lens module 1210 and the first shaft 1215a when the first lens module 1210 moves in the optical axis direction (the Z-axis direction).

A coating material may be applied onto a surface of the first shaft 1215a.

The coating material may be a solid lubricant mixed with a resin material binder such as polyamideimide or epoxy, and optionally, various kinds of additives may be added to the coating material to impart an abrasion resistance function, a rust prevention function, and the like in addition to the lubricating and sliding effects.

The solid lubricant mixed with the binder may be at least one of Teflon, molybdenum (MOS2), polytetrafluoroethylene (PTFE, fluororesin), and graphite.

Referring to FIG. 18B, the first lens module 1210 may include a lens barrel 1210B having a lens therein and a holder 1210H surrounding the lens barrel 1210B. All the components described as being provided in the first lens module 1210 with reference to FIGS. 16 and 17 may be provided in the holder 1210H, and movement of the holder 1210H may be guided in a state in which the holder 1210H is supported on the housing 1010 by the first shaft 1215a and the third ball member 1215b.

In the example of FIG. 18B, the 6-1st guide groove 1214a into which the first shaft 1215a is inserted may be provided in the holder 1210H, and the first bearing members 1218 may be disposed in the 6-1st guide groove 1214a to be fixed to the holder 1210H.

Alternatively, the first bearing members 1218 may be integrally coupled to the holder 1210H by insert injection. In this case, by injecting a resin material into a mold in a state in which the first bearing members 1218 are fixed in the mold, the first bearing members 1218 may be manufactured to be integrated with the holder 1210H.

Upper and lower sides of the lens barrel 1210B fitted into the holder 1210H may be provided in thin shape to reduce a thickness, and thus, a reinforcing member 1210M made of a metallic material (e.g., non-magnetic metal) may be provided on the holder 1210H in a shape to surround the lens barrel 1210B to supplement rigidity.

The reinforcing member 1210M may be separately or integrally provided to surround the upper and lower sides of the lens barrel 1210B. The reinforcing member 1210M may be coupled to the lens barrel 1210B using an adhesive or the like, or may be integrally provided with the lens barrel 1210B by insert injection.

In describing most of the structures herein, the first lens module 1210 is described as an integrally provided structure. However, the first lens module 1210 may include a lens barrel 1210B having a lens therein and a holder 1210H surrounding the lens barrel 1210B, as described with reference to FIG. 18B.

Figure 20:
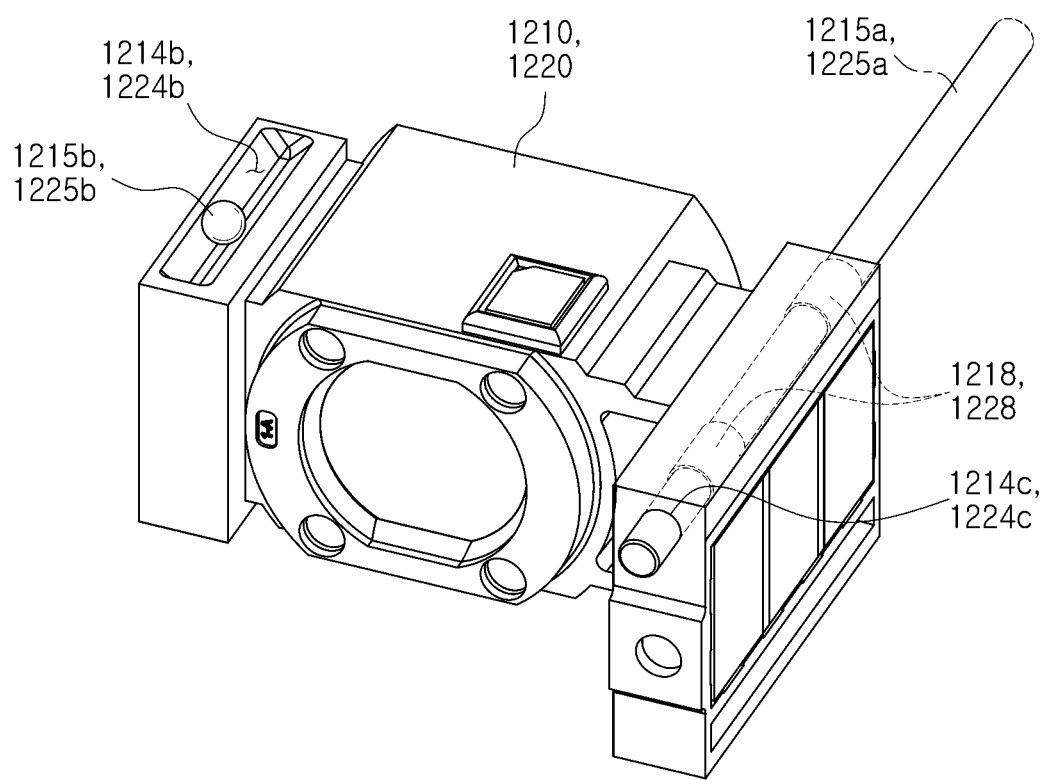
FIG. 20 is a perspective view illustrating an example of a structure in which the lens module or a lens barrel coupled to a holder is supported by the housing according to another example.
Figure 21:
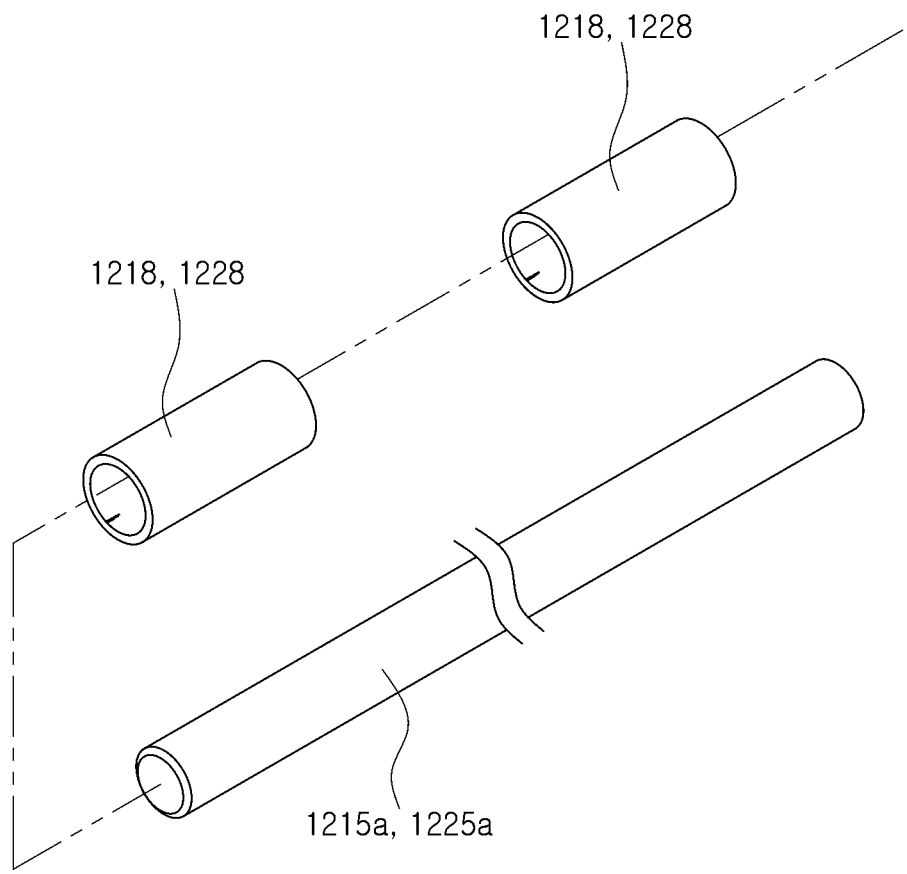
FIG. 21 illustrates perspective views of a shaft and a bearing member according to another example.

FIG. 20 is a perspective view illustrating an example of a structure in which the lens module or a lens barrel coupled to a holder is supported by the housing according to another example, and FIG. 21 illustrates perspective views of the shaft and the bearing member according to another example.

Referring to FIGS. 20 and 21, each of the first bearing members 1218 may be an oilless bearing having a cylindrical sleeve shape.

The first shaft 1215a may be fitted into the first bearing members 1218.

The first lens module 1210 may have a guide hole 1214c into which the first shaft 1215a is inserted, and the first bearing members 1218 may be disposed in the guide hole 1214c to be fixed to the first lens module 1210. For example, two first bearing members 1218 may be fixed in the guide hole 1214c while being spaced apart from each other in the optical axis direction (the Z-axis direction), and each of the two first bearing members 1218 may contact the first shaft 1215a. Likewise, the second lens module 1220 may have a guide hole 1224c into which the second shaft 1225b is inserted, and the second bearing members 1228 may be disposed in the guide hole 1224c to be fixed to the second lens module 1220.

Alternatively, the first bearing members 1218 may be integrally coupled to the first lens module 1210 by insert injection. In this case, by injecting a resin material into a mold in a state in which the first bearing members 1218 are fixed in the mold, the first bearing members 1218 may be manufactured to be integrated with the first lens module 1210.

Therefore, it is possible to reduce friction between the first lens module 1210 and the first shaft 1215a when the first lens module 1210 moves in the optical axis direction (the Z-axis direction).

Figure 22:
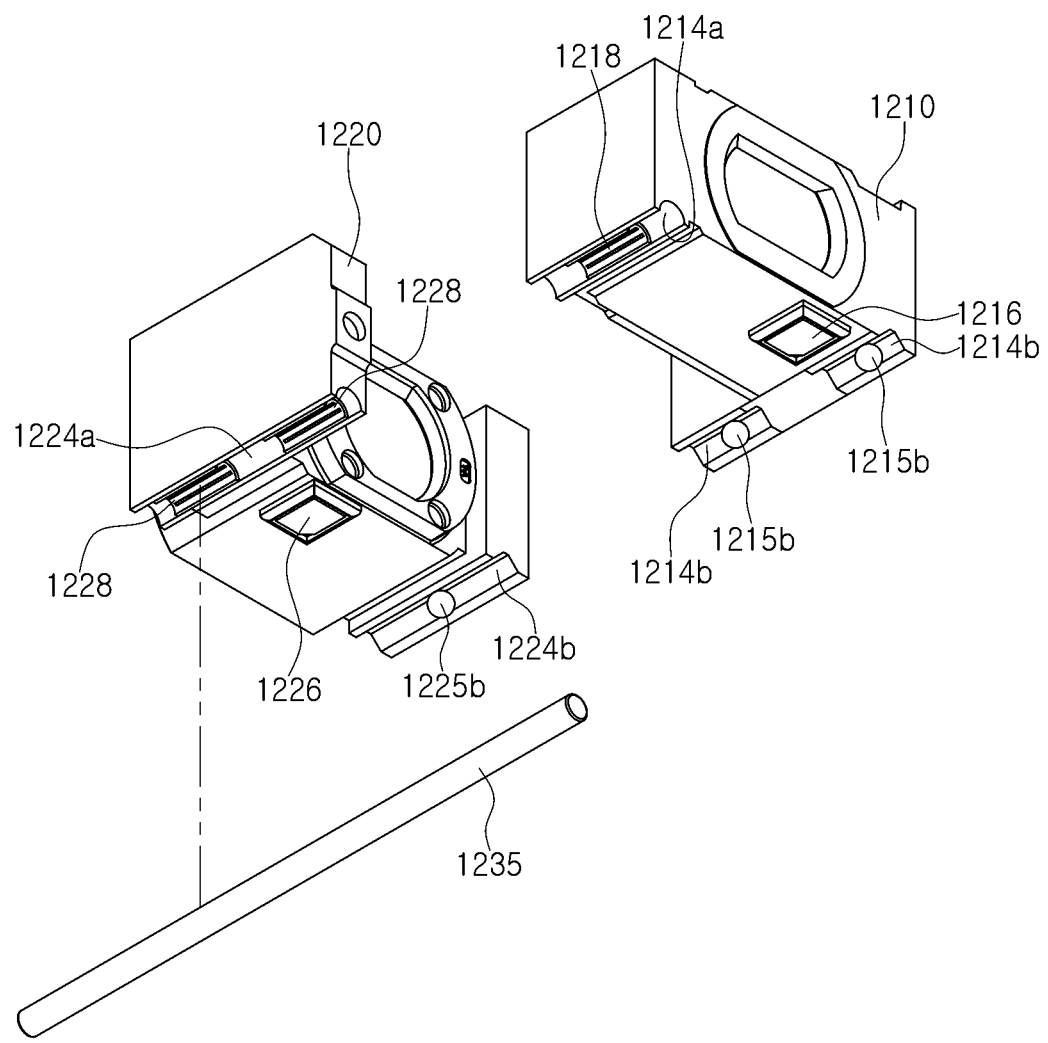
FIG. 22 is a perspective view illustrating a structure in which a lens module is supported by a housing according to another example.

FIG. 22 is a perspective view illustrating a structure in which a lens module is supported by a housing according to another example.

In the above-described examples, the first lens module 1210 may move in the optical axis direction (the Z-axis direction) along the first shaft 1215a, and the second lens module 1220 may move in the optical axis direction (the Z-axis direction) along the second shaft 1225a. In contrast, in the example illustrated in FIG. 22, both the first lens module 1210 and the second lens module 1220 may move in the optical axis direction (the Z-axis direction) along one shaft 1235.

For example, both one side of the first lens module 1210 and one side of the second lens module 1220 may be supported by one shaft 1235, the other side of the first lens module 1210 may be supported by the third ball member 1215b, and the other side of the second lens module 1220 may be supported by the fourth ball member 1225b.

Accordingly, sliding friction may occur on one side of the first lens module 1210, and rolling friction may occur on the other side of the first lens module 1210. Also, sliding friction may occur on one side of the second lens module 1220, and rolling friction may occur on the other side of the second lens module 1220.

One side of the first lens module 1210 may contact the shaft 1235 at one spot, and one side of the second lens module 1220 may contact the shaft 1235 at two spots.

The other side of the first lens module 1210 may contact two third ball members 1215b, and the other side of the second lens module 1220 may contact one fourth ball member 1225b.

Therefore, each of the first lens module 1210 and the second lens module 1220 has a three-spot support structure.

Bearing members contacting the shaft 1235 may be disposed on the first lens module 1210 and the second lens module 1220. For example, the first bearing member 1218 may be disposed on one side of the first lens module 1210, and the second bearing members 1228 may be disposed on one side of the second lens module 1220.

The number of first bearing members 1218 may be different from the number of second bearing members 1228. For example, one first bearing member 1218 may be disposed on one side of the first lens module 1210, and two second bearing members 1228 may be disposed on one side of the second lens module 1220 to be spaced apart from each other in the optical axis direction (the Z-axis direction).

The other side of the first lens module 1210 (the opposite side of the one side with respect to the optical axis (the Z axis)) may be supported by two third ball members 1215b spaced apart from each other in the optical axis direction (the Z-axis direction), and the other side of the second lens module 1220 may be supported by one fourth ball member 1225b.

A 6-1st guide groove 1214a into which the shaft 1235 is inserted may be provided in the lower surface of the first lens module 1210 facing the shaft 1235, and 6-2nd guide grooves 1214b in which the third ball members 1215b are disposed may be provided in the lower surface of the first lens module 1210 facing the third ball members 1215b.

One first bearing member 1218 may be fixedly disposed in the 6-1st guide groove 1214a. Since the two third ball members 1215b are disposed to be spaced apart from each other in the optical axis direction (the Z-axis direction) on the other side of the first lens module 1210, the two 6-2nd guide grooves 1214b may be disposed in the lower surface of the first lens module 1210 to be spaced apart from each other in the optical axis direction (the Z-axis direction).

An 8-1st guide groove 1224a into which the shaft 1235 is inserted may be provided in the lower surface of the second lens module 1220 facing the shaft 1235, and an 8-2nd guide groove 1224b in which the fourth ball member 1225b is disposed may be provided in the lower surface of the second lens module 1220 facing the fourth ball member 1225b.

Two second bearing members 1228 spaced apart from each other in the optical axis direction (the Z-axis direction) may be fixedly disposed in the 8-1st guide groove 1224a.

One fourth ball member 1225b may be disposed in the 8-2nd guide groove 1224b to be movable in a rolling manner.

The other configurations of the first and second bearing members 1218 and 1228 may be the same as those in the above-described examples, and thus, the detailed description thereof will not be repeated.

Referring additionally to FIGS. 26 through 33, the dampers of the rotation holder and the stoppers of the lens module installed according to an example are disclosed.

Figure 26:
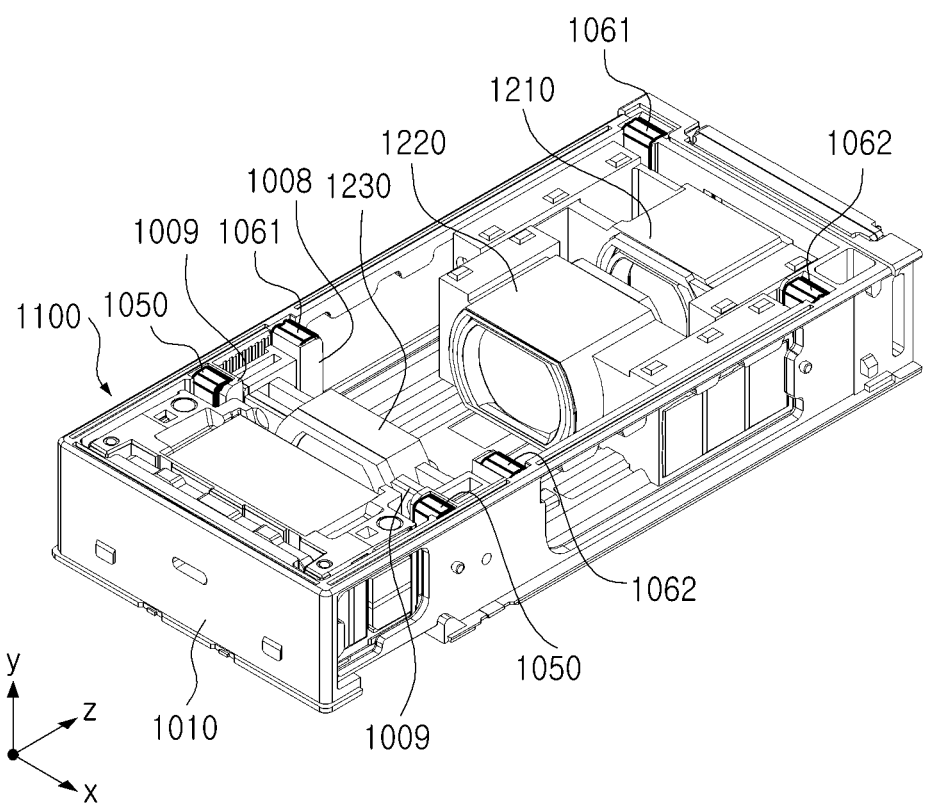
FIG. 26 is a perspective view illustrating a state in which dampers of the rotation holder and stoppers of the lens module are installed according to an example.
Figure 27:
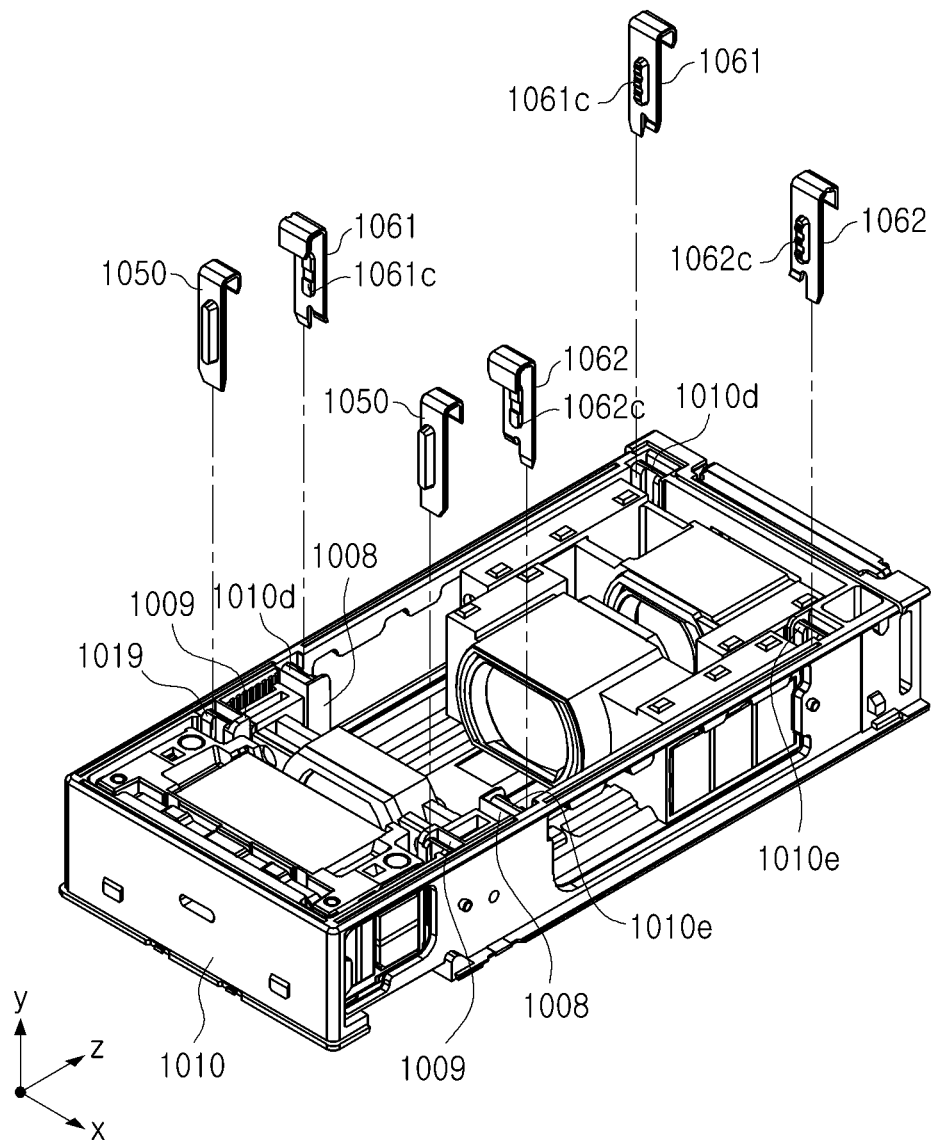
FIG. 27 is an exploded perspective view of FIG. 26 when the dampers of the rotation holder and the stoppers of the lens module are disassembled.

Referring to FIG. 26, the reflection module 1100 and the lens module 1200 may be disposed in a space partitioned by the first protruding walls 1009.

For example, the reflection module 1100 may be disposed in front of the first protruding walls 1009, and the lens module 1200 may be disposed behind the first protruding walls 1009.

The reflection module 1100 may contact the housing 1010 due to an impact caused, for example, when the reflection module 1100 rotates for optical image stabilization, and the lens module 1200 may contact the housing 1010, for example, in a process of moving in the optical axis direction for implementing a zoom or autofocus function or by an external impact. In this case, damage or excessive stroke makes it difficult to accurately control a position in the optical axis direction.

Thus, as described above, the housing 1010 of the camera module may be provided with dampers 1050 fitted into the insertion grooves 1019 provided in an upper side of the housing 1010, that is, upper sides of the first protruding walls 1009.

Stoppers 1060 may be provided to control the movement of the first and second lens modules 1210 and 1220, respectively. The stoppers 1060 may include first stoppers 1061 restricting a movement distance of the first lens module 1210 and second stoppers 1062 restricting a movement distance of the second lens module 1220.

A pair of first stoppers 1061 may be provided at both ends of the first shaft 1215a to restrict a movement distance of the first lens module 1210, and a pair of second stoppers 1062 may be provided at both ends of the second shaft 1225a to restrict a movement distance of the second lens module 1220.

For example, the first stoppers 1061 may be disposed to press both ends of the first shaft 1215a in the Y-axis direction, and the second stoppers 1062 may be disposed to press both ends of the second shaft 1225a in the Y-axis direction.

The housing 1010 may have first and second hooking portions 1010d and 1010e, and the first and second stoppers 1061 and 1062 may be fastened to the first and second hooking portions 1010d and 1010e.

The first stopper 1061 and the second stopper 1062 may include damping materials 1061c and 1062c on portions facing the first and second lens modules 1210 and 1220, respectively, to absorb shocks when the first and second lens modules 1210 and 1220 come into contact with the damping materials 1061c and 1062c.

The first and second lens modules 1210 and 1220 may collide with the cover 1030 while unintentionally moving in a direction perpendicular to the optical axis direction due to a shake, an external impact, or the like.

Figure 28:
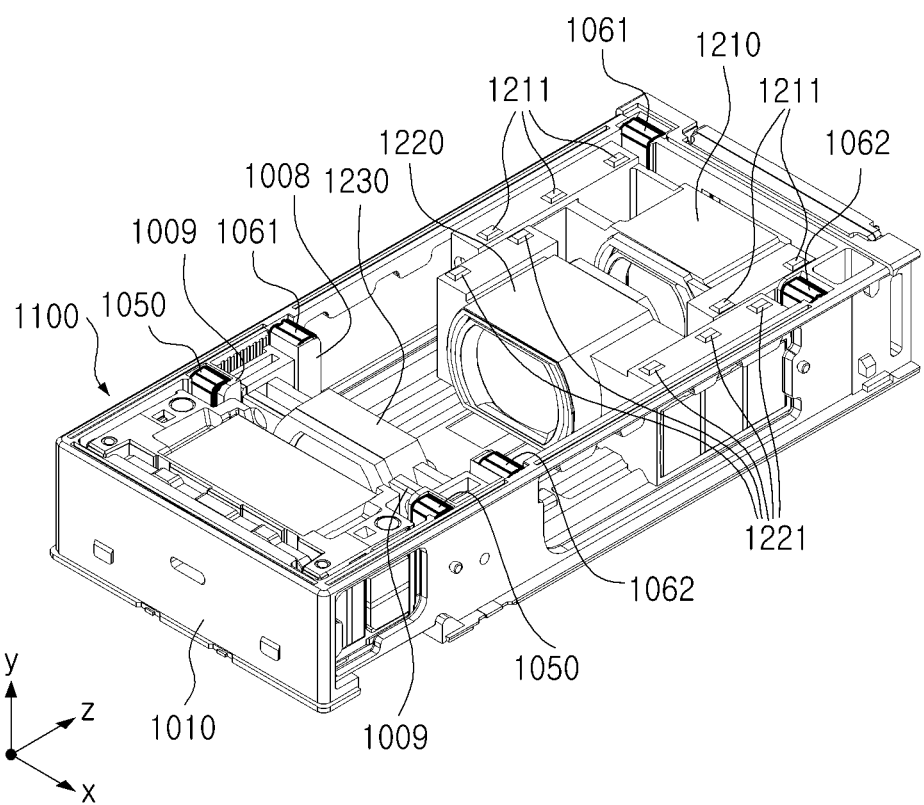
FIG. 28 is a perspective view illustrating the stoppers provided in the camera module according to an example.

Thus, referring to FIG. 28, a plurality of third and fourth stoppers 1211 and 1221 made of a material capable of absorbing shocks may be disposed on upper surfaces of the first and second lens modules 1210 and 1220 facing the cover 1030. The plurality of third and fourth stoppers 1211 and 1221 may prevent the first and second lens modules 1210 and 1220 from directly contacting the cover 1030, thereby preventing the first and second lens modules 1210 and 1220 from being damaged.

Figure 29B:
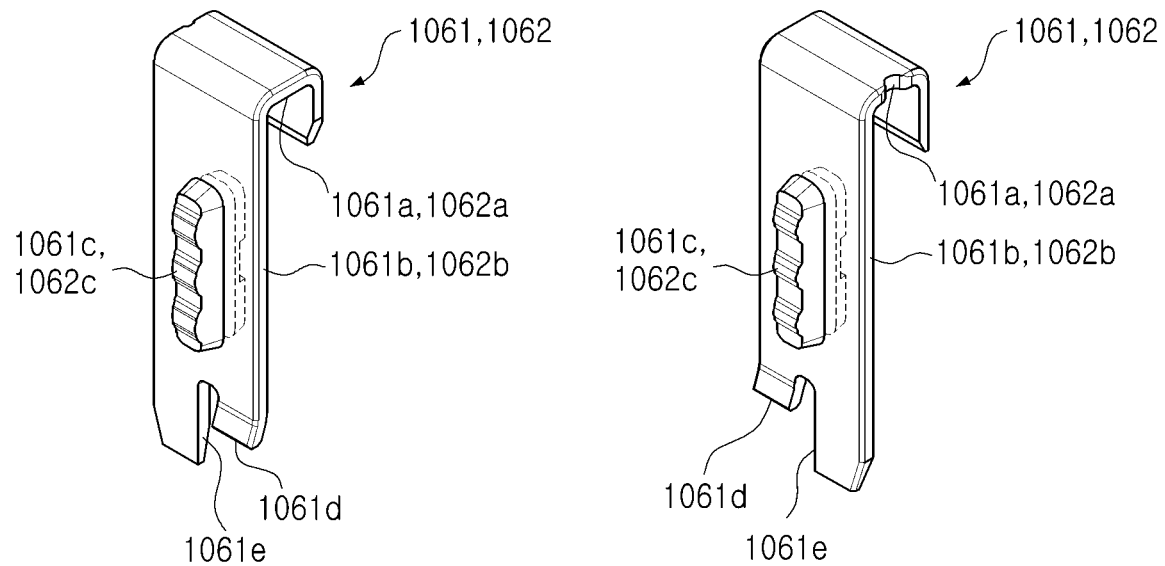
FIG. 29B illustrates perspective views of the stoppers according to an example.
Figure 30:
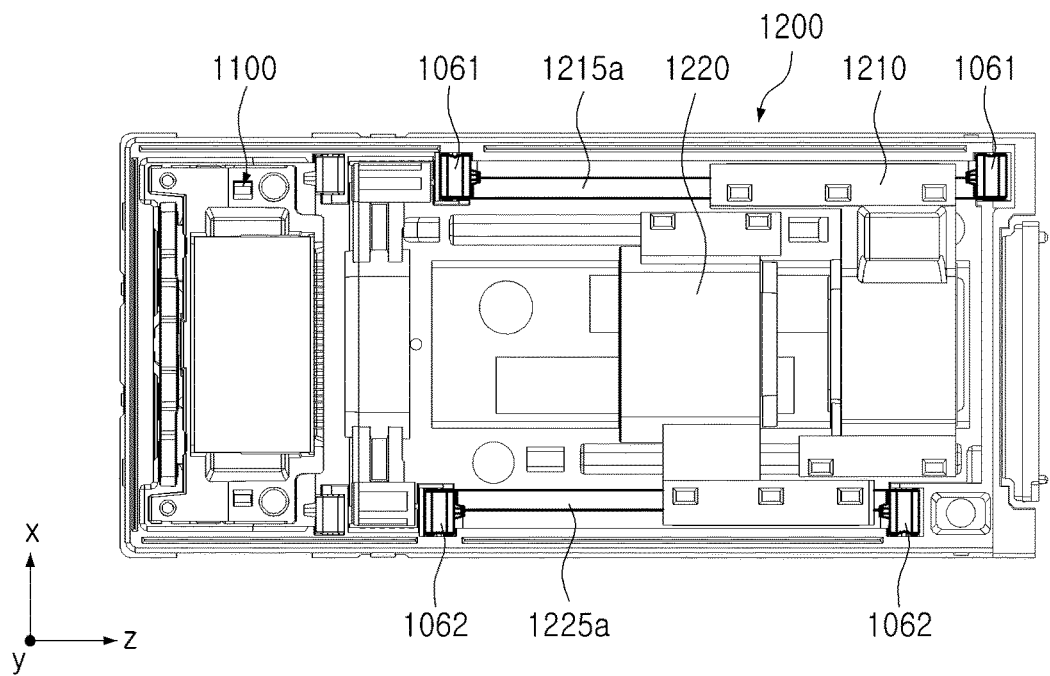
FIG. 30 is a perspective view illustrating positions in which the stoppers are installed according to an example.
Figure 31:
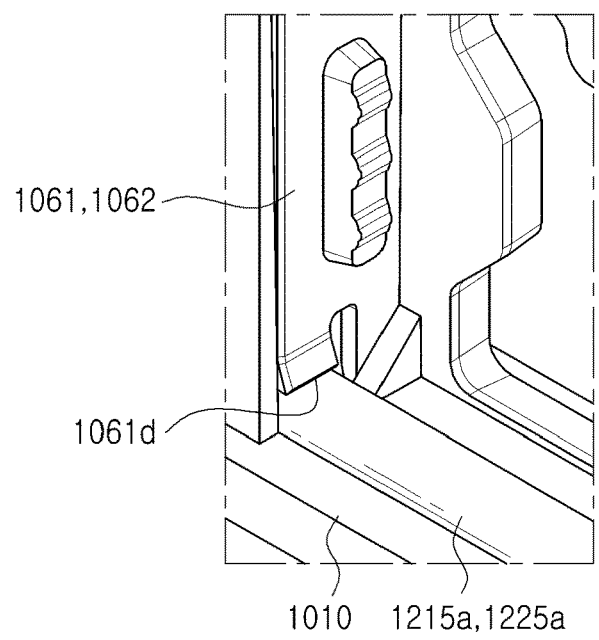
FIGS. 31, 32, and 33 are perspective views each illustrating a structure in which the stopper is installed according to an example.
Figure 32:
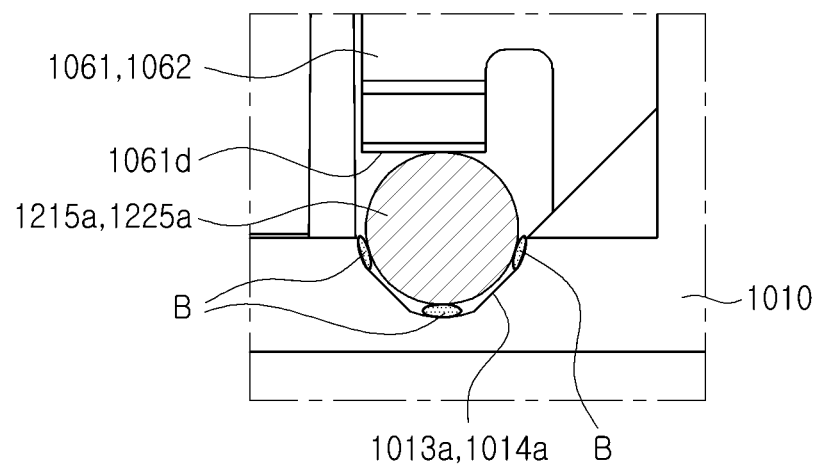

Referring to FIG. 29B, the first and second stoppers 1061 and 1062 may include frames 1061a and 1062a, extension portions 1061b and 1062b extending from the frames 1061a and 1062a in a direction perpendicular to the optical axis direction (the Z-axis direction), and damping materials 1061c and 1062c provided on the extension portions 1061b and 1062b, respectively.

The damping materials 1061c and 1062c may be inserted into holes provided in the extension portions 1061b and 1062b to protrude from both surfaces of the extension portions 1061b and 1062b, or may be fixedly provided on both surfaces of the extension portions 1061b and 1062b by bonding using an adhesive.

Each of the frames 1061a and 1062a may be provided in a hook shape to be caught by one side end of the housing 1010 or an upper portion of the protruding wall, and each of the extension portions 1061b and 1062b and each of the damping materials 1061c and 1062c may be sandwiched between one side of each of the first and second lens modules 1210 and 1220 and a side surface or a protruding wall of the housing 1010.

The frames 1061a and 1062a may be press-fitted onto or slidably coupled to the side walls or the protruding walls of the housing 1010 in a hook manner, and may be further fixed by bonding using an adhesive.

Referring to FIGS. 30 through 33, the stoppers 1061 and 1062 may be provided to press both ends of the shafts 1215a and 1225a.

That is, the stoppers 1061 and 1062 may be provided at both ends of the shafts 1215a and 1225a to restrict moving distances of the first and second lens modules 1210 and 1220 or to absorb shocks of the first and second lens modules 1210 and 1220, and may be fixed to the housing by being fitted downward from above in a press-fitted manner and/or fixed to the housing in a bonding manner using an adhesive. Using such a fixing force, the stoppers 1061 and 1062 may serve to fix the shafts 1215a and 1225a installed on the bottom of the housing.

Thus, partially-cut support portions may be provided in end portions of the stoppers 1061 and 1062, that is, ends of the extension portions 1061*b* and 1062*b*, to easily contact the shafts 1215*a* and 1225*a*, and the support portions may include upper support portions 1061*d* contacting upper sides of the shafts 1215*a* and 1225*a* and side support portions 1061*e* facing the side surfaces of the shafts 1215*a* and 1225*a* (FIG. 29B).

Figure 33:
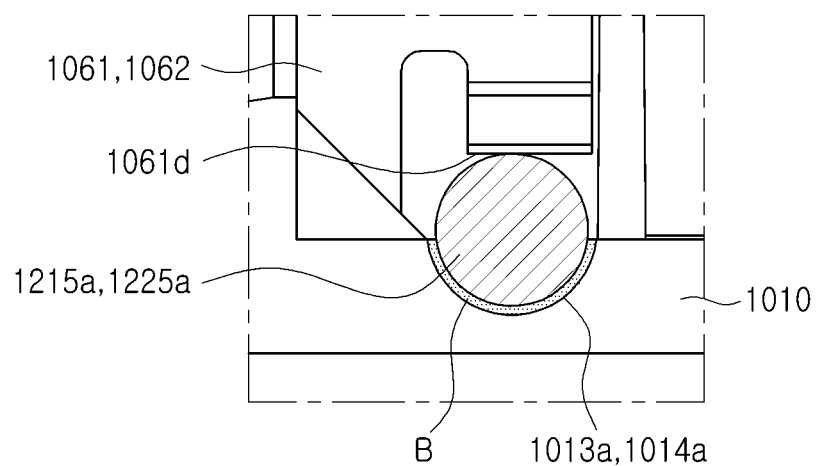

The shafts 1215*a* and 1225*a* may be fixed into the guide grooves 1013*a* and 1014*a* of the housing 1010 by bonding using an adhesive. The shafts 1215*a* and 1225*a* may be fixed into the guide grooves 1013*a* and 1014*a* by applying the adhesive (B) to a plurality of locations of circumferences of the shafts 1215*a* and 1225*a* (FIG. 32), or by continuously applying the adhesive along the circumferences of the shafts 1215*a* and 1225*a* (FIG. 33).

As set forth above, according to the various examples, the camera module is capable of implementing a zoom function, and even though the plurality of lens modules move in the optical axis direction to implement the zoom function, the optical axes of the plurality of lens modules can be maintained in an aligned state.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing defining an internal space;
   a first lens module disposed in the internal space and configured to move along an optical axis direction, the first lens module comprising at least one first bearing member;
   a second lens module disposed in the internal space and configured to move along the optical axis direction, the second lens module comprising at least one second bearing member;
   a shaft disposed in the housing and contacting the at least one first bearing member to support a first side of the first lens module, and contacting the at least one second bearing member to support a first side of the second lens module;
   at least one first ball member supporting a second side of the first lens module; and
   at least one second ball member supporting a second side of the second lens module.

2. The camera module of claim 1, wherein the at least one first bearing member is disposed on the first side of the first lens module, and the at least one second bearing member is disposed on the first side of the second lens module, and
   a quantity of the at least one first bearing member is different from a quantity of the at least one second bearing member.

3. The camera module of claim 1, wherein the at least one first bearing member comprises a first bearing member disposed on the first side of the first lens module, and the at least one second bearing member comprises two second bearing members disposed on the first side of the second lens module and spaced apart from each other along the optical axis direction,
   the at least one first ball member comprises two first ball members supporting the second side of the first lens module and spaced apart from each other along the optical axis direction, and
   the at least one second ball member comprises a single second ball member supporting the second side of the second lens module.

4. The camera module of claim 3, wherein the second side of the first lens module is longer in the optical axis direction than the first side of the first lens module in the optical axis direction, and
   the first side of the second lens module is longer in the optical axis direction than the second side of the second lens module in the optical axis direction.

5. The camera module of claim 3, further comprising:
   first magnetic materials configured to generate a first magnetic force in a direction perpendicular to the optical axis direction disposed on surfaces of the first lens module and the housing facing each other, respectively; and
   second magnetic materials configured to generate a second magnetic force in a direction perpendicular to the optical axis direction disposed on surfaces of the second lens module and the housing facing each other, respectively.

6. The camera module of claim 5, wherein a center of action of the first magnetic force is located closer to the two first ball members than to the shaft, and
   a center of action of the second magnetic force is located closer to the shaft than to the single second ball member.

7. The camera module of claim 1, further comprising:
   first magnets disposed on a side surface of the first lens module, and a first coil unit comprising a plurality of coils disposed facing the first magnets in a direction perpendicular to the optical axis direction; and
   second magnets disposed on a side surface of the second lens module, and a second coil unit comprising a plurality of coils disposed facing the second magnets in a direction perpendicular to the optical axis direction, and
   the side surface of the first lens module and the side surface of the second lens module are disposed on opposite sides of an optical axis of the first lens module and the second lens module relative to each other.

8. The camera module of claim 1, wherein the first lens module comprises a first guide hole penetrating through the first lens module in the optical axis direction, and the second lens module comprises a second guide hole penetrating through the second lens module in the optical axis direction, and
   the at least one first bearing member is disposed in the first guide hole, and the at least one second bearing member is disposed in the second guide hole.

9. The camera module of claim 8, wherein each of the first bearing member and the second bearing member is an oilless bearing or a linear bearing having a cylindrical sleeve shape.

10. The camera module of claim 1, wherein guide grooves configured to accommodate the shaft are formed in a lower surface of the first lens module on the first side of the first lens module, and in a lower surface of the second lens module on the first side of the second lens module, respectively, and each of the at least one first bearing member and the at least one second bearing member is disposed in a respective one of the guide grooves, and is a linear bearing having a hemispherical sleeve shape.

11. The camera module of claim 1, wherein when the first lens module and the second lens module move along the optical axis direction, sliding friction occurs on the first side of the first lens module and on the first side of the second lens module, and rolling friction occurs on the second side of the first lens module and on the second side of the second lens module.

12. The camera module of claim 1, further comprising:
a reflection module disposed on an object side of the first lens module and the second lens module and configured to change a path of light incident onto the reflection module and emit light having the changed path that passes through first lens module and the second lens module; and
an image sensor module comprising an image sensor configured to receive the light emitted from the reflection module that has passed through the first lens module and the second lens module.

13. A camera module comprising:
a housing defining an internal space;
a first lens module disposed in the internal space and configured to move along an optical axis direction, the first lens module comprising at least one first bearing member; and
a second lens module disposed in the internal space and configured to move along the optical axis direction, the second lens module comprising at least one second bearing member,
wherein the first lens module is movably supported by a first shaft configured to interact with the first bearing member, and by a first ball member,
the second lens module is movably supported by a second shaft configured to interact with the second bearing member, and by a second ball member, and
the first shaft and the second shaft are disposed on opposite sides of an optical axis of the first lens module and the second lens module relative to each other.

14. The camera module of claim 13, wherein when the first lens module moves along the optical axis direction, sliding friction occurs on the first shaft, and rolling friction occurs on the first ball member, and
when the second lens module moves along the optical axis direction, sliding friction occurs on the second shaft, and rolling friction occurs on the second ball member.

15. The camera module of claim 13, wherein each of the first bearing member and the second bearing member is an oilless bearing or a linear bearing.

16. The camera module of claim 13, wherein the first bearing member and the second bearing member are integrally coupled to the first lens module and the second lens module, respectively, by insert injection.

* * * * *